(12) United States Patent
Singh et al.

(10) Patent No.: US 12,075,547 B2
(45) Date of Patent: Aug. 27, 2024

(54) SYSTEM AND METHOD TO OPTIMIZE A LIGHT EMITTING DIODE POWER ALLOCATION FRAMEWORK

(71) Applicant: Cognizant Technology Solutions India Pvt. Ltd., Chennai (IN)

(72) Inventors: Anand Singh, Narsinghpur (IN); Anand Srivastava, New Delhi (IN); Vivek Ashok Bohara, New Delhi (IN); Anand Kumar Jagadeesan, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 2 days.

(21) Appl. No.: 18/101,739

(22) Filed: Jan. 26, 2023

(65) Prior Publication Data

US 2024/0260162 A1 Aug. 1, 2024

(51) Int. Cl.
*H05B 47/195* (2020.01)
*H04B 10/116* (2013.01)
*H05B 47/115* (2020.01)

(52) U.S. Cl.
CPC ......... *H05B 47/195* (2020.01); *H04B 10/116* (2013.01); *H05B 47/115* (2020.01)

(58) Field of Classification Search
CPC .. H04B 10/116; H04B 10/501; H04B 10/502; H04B 10/516; H04B 10/66; H04B 10/676; H05B 47/115; G02F 1/0126
See application file for complete search history.

(56) References Cited

U.S. PATENT DOCUMENTS

| 11,212,008 B2 | 12/2021 | Brandt-Pearce | |
| 2016/0047890 A1* | 2/2016 | Ryan | H04W 4/02 398/118 |
| 2018/0167140 A1* | 6/2018 | Brandt-Pearce | H04B 10/502 |

FOREIGN PATENT DOCUMENTS

| CN | 109302234 A | 2/2019 |
| CN | 110289908 A | 9/2019 |

(Continued)

OTHER PUBLICATIONS

Translation of CN 115549786 A (Year: 2022).*

(Continued)

*Primary Examiner* — Renan Luque
(74) *Attorney, Agent, or Firm* — CANTOR COLBURN LLP

(57) ABSTRACT

A system 10 to optimize a light emitting diode (LED) power allocation framework within a room is disclosed. The system 10 includes a data receiving subsystem 20, configured to receive parameters corresponding to light emitting diodes (LED), visible light communication (VLC) transmitters and visible light communication (VLC) receivers. The system 10 includes a blockage generalization subsystem 22, configured to identify location and height of one or more detected blockages within the room from the received parameters. The system 10 includes an optimal power allocation subsystem 24, configured to compute a visible light communication (VLC) channel gain for each of the one or more light emitting diodes (LED) with reference to identified location and identified height and configured to optimize the power allocation framework to achieve maximized visible light communication (VLC) data rate based on the computed visible light communication (VLC) channel gain and one or more constraints.

13 Claims, 19 Drawing Sheets

(56) References Cited

FOREIGN PATENT DOCUMENTS

| CN | 111901037 | A | | 11/2020 | | |
|---|---|---|---|---|---|---|
| CN | 112394322 | A | | 2/2021 | | |
| CN | 113783619 | A | | 12/2021 | | |
| CN | 114296030 | A | | 4/2022 | | |
| CN | 115549786 | A | * | 12/2022 | | |
| WO | 2020030463 | A1 | | 2/2020 | | |
| WO | WO-2024018174 | A1 | * | 1/2024 | ......... | H04B 10/1149 |

OTHER PUBLICATIONS

Indoor visible light communications: performance evaluation and optimization, URL:https://jwcn-eurasipjournals.springeropen.com/articles/10.1186/s13638-018-1243-x, Sep. 21, 2018.
Joint Dimming Control and Transceiver Design for MIMO-Aided Visible Light Communication, URL: Joint Dimming Control and Transceiver Design for MIMO-Aided Visible Light Communication | IEEE Journals & Magazine | IEEE Xplore, Aug. 4, 2016.
Optimal and Robust Power Allocation for Visible Light Positioning Systems under Illumination Constraints, URL: https://arxiv.org/pdf/1802.04505.pdf, Feb. 13, 2018.

* cited by examiner

SYSTEM AND METHOD TO OPTIMIZE A LIGHT EMITTING DIODE POWER ALLOCATION FRAMEWORK

BACKGROUND

Embodiments of the present invention relates to a communication system and more particularly to a system and a method to optimize a light emitting diode (LED) power allocation framework within a room for a location-assisted Indoor Visible Light Communication (VLC) System.

DESCRIPTION OF RELATED ART

Light-emitting diode (LED) refers to a semiconductor light source that emits light when current flows through a diode. Apart from illumination, the light-emitting diode (LED) may also be used for communication purpose. A LiFi attocell network uses the lighting system to provide wireless access to multiple light fixtures. Each of these light fixture function as a very small radio base station, and that results in a network of very small cells. The small cells are called as 'optical attocells.'

The widespread use of light-emitting diodes (LEDs) for interior lighting has provided an opportunity to create a whole new form of internal communication and indoor positioning system. Light-emitting diodes (LED) can be modulated at megahertz (MHz) frequencies and transmit data at very high speeds.

Intensity modulation/direct detection (IM/DD) is a primary operating principle of visible light communication (VLC). Here, the light intensity from the transmitting light-emitting-diodes (LEDs) is used to modulate the information signal which can be received at the photodetectors and converted into an electrical signal. Light-emitting-diode sources serve the dual role of illumination and communications which could result into considerable power savings.

The visible light communication (VLC) system performance suffers from high interference from other light sources and significant blockage losses due to shadowing. Specifically, communication performances within a room depends on various factors, such as the location of the emitting Light-emitting diodes (LEDs), the different types of obstacles (for example user) present in the room and their location, and the like.

Conventionally, to understand a user's location in an enclosed area, one or more positioning models have been used. Whereby the user's position is determined using light-emitting-diode (LED) beacons. Such positioning method uses new geometric techniques, and system performance is analysed using simulations. Such positioning system fail to consider problem of failures in visible light positioning (VLP) systems.

Another method to understand a user's location in an enclosed area, was implementation of VLC-assisted four-line perspective algorithm (V-P4L) for indoor localization. The basic principle of the visible light communication (VLC)-assisted four-line perspective algorithm (V-P4L) is to jointly use the coordinate information obtained by visible light communication (VLC) and the geometric information in computer vision for a convenient indoor location. The focus of such algorithm was to optimize the location accuracy but on the whole fail to enhance a light emitting diode (LED) power allocation framework. Thereby no impact on the communication performances.

Hence, there is a need for an improved system and a method to optimize a light emitting diode (LED) power allocation framework within a room for a location-assisted Indoor Visible Light Communication (VLC) System in order to address the aforementioned issues.

BRIEF DESCRIPTION

In accordance with an embodiment of a present disclosure, a computing system to optimize a light emitting diode (LED) power allocation framework within a room is disclosed. The computing system includes a memory storing programme instructions. The computing system also includes a processor configured to execute programme instructions stored in the memory. The processor includes a data receiving subsystem. The data receiving subsystem is configured to receive parameters corresponding to one or more light emitting diodes (LED), one or more visible light communication (VLC) transmitters and one or more visible light communication (VLC) receivers.

The processor includes a blockage generalization subsystem. The blockage generalization subsystem is configured to identify location and height of one or more detected blockages within the room from the received parameters via one or more location assistance technique. The processor includes an optimal power allocation subsystem. The optimal power allocation subsystem is configured to compute a visible light communication (VLC) channel gain for each of the one or more light emitting diodes (LED) with reference to identified location and identified height of one or more detected blockages. The optimal power allocation subsystem is also configured to optimize the power allocation framework to achieve maximized visible light communication (VLC) data rate based on the computed visible light communication (VLC) channel gain and one or more constraints.

In accordance with another embodiment of the present disclosure, a method to optimize a light emitting diode (LED) power allocation framework within a room is disclosed. The method includes receiving parameters corresponding to one or more light emitting diodes (LED), one or more visible light communication (VLC) transmitters and one or more visible light communication (VLC) receivers. The method also includes identifying location and height of one or more detected blockages within the room from the received parameters via one or more location assistance technique.

The method also includes computing a visible light communication (VLC) channel gain for each of the one or more light emitting diodes (LED) with reference to identified location and identified height of one or more detected blockages. The method also includes optimizing the power allocation framework to achieve maximized visible light communication (VLC) data rate based on the computed visible light communication (VLC) channel gain and one or more constraints.

BRIEF DESCRIPTION OF THE DRAWINGS

FIG. 9A showcase the average achieved data rate for a room size of 5 m*5 m*3 m with 4 and 8 LEDs:

FIG. 12A showcase the power saving with varying number of human blockages for with and without illumination constraints for the optimization problem:

FIG. 13A showcase the BER performance in the presence of human blockages:

FIG. 14A showcase the BER performance with blockages using OOK and DCO-OFDM, respectively using location information:

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Figure 1:
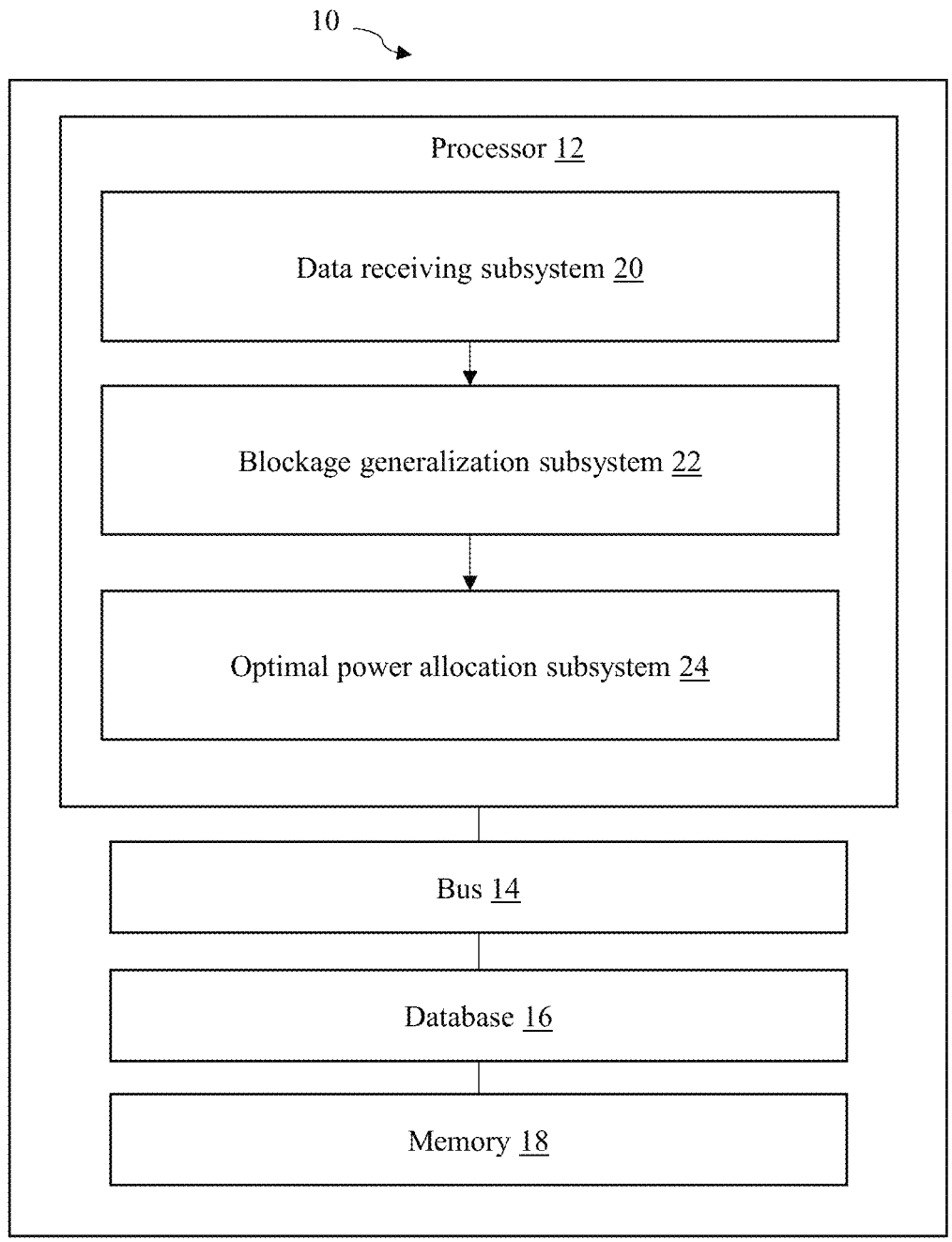
FIG. 1 is a block diagram of a computing system to optimize a light emitting diode (LED) power allocation framework within a room for a location-assisted Indoor Visible Light Communication (VLC) System in accordance with an embodiment of the present disclosure.

FIG. 1 is a block diagram of a computing system 10 to optimize a light emitting diode (LED) power allocation framework within a room for a location-assisted Indoor Visible Light Communication (VLC) System in accordance with an embodiment of the present disclosure. The computing system 10 maximizes the average data rate across the room, even though the Visible Light Communication (VLC) System is subjected to predefined communication constraints as well as number of blockages inside the room. In one embodiment, the computing system 10 also maximizes the power savings among the Light emitting diodes (LED) with respect to the number of blockages and permissible localization error.

As used herein, the term "Visible light communication (VLC)" is a data communications variant which uses visible light between 400 and 800 THz (780-375 nm). As used herein, the term "data rate" is a term to denote the transmission speed, or the number of bits per second transferred. As used herein, the term "localization error" is defined as $\Sigma_{k=1}^{K} \|\hat{\zeta}_k - \zeta_k\|/K$, where K is the source number, $\hat{\zeta}_k$ and $\zeta_k$ are the estimated location and the real location of the kth source, respectively.

The computing system 10 comprises a memory 18 storing programme instructions. The computing system 10 also comprises a processor 12. The processor 12 is configured to execute programme instructions stored in the memory 18. In one embodiment, a server includes the processor(s) 12, and the memory 18 operatively coupled by a bus 14. The processor(s) 12, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 18 comprises programme instructions stored in the form of executable program which instructs the processor 12 via one or more subsystems to perform the steps. The bus 14 as used herein refers to be internal memory channels or computer network that is used to connect computer components and transfer data between them.

The computing system 10 includes a data receiving subsystem 20. The data receiving subsystem 20 is configured to receive parameters corresponding to one or more Light emitting diodes (LEDs), one or more Visible light communication (VLC) transmitters and one or more Visible light communication (VLC) receivers.

In one embodiment, the received parameters may include data related total transmitted power, refractive index, optical filter gain, wall reflection, number of users, LED semi angle, number of receiver location, receiver elevation, receiver active area, and the like. In one exemplary embodiment, the received parameters are predefined for the room and stored in the computing system 10 database 16. In another exemplary embodiment, the received parameters are provided in real time through an input/output device (not shown in FIG. 1).

The computing system 10 also includes a blockage generalization subsystem 22. The blockage generalization subsystem 22 is configured to identify location and height of one or more detected blockages within the room from the received parameters via one or more location assistance technique. The one or more detected blockages includes human blockage and objects. In one embodiment, the one or more location assistance technique includes a linear regression technique. In such embodiment, the linear regression is applied to the results to develop a predictive algorithm to obtain the location and height of an obstacle from the received power profile.

The computing system 10 also includes optimal power allocation subsystem 24. The optimal power allocation subsystem 24 is configured to compute a Visible light Communication (VLC) channel gain for each of the one or more Light Emitting Diode (LED) with reference to identified location and identified height of one or more detected blockages from the blockage generalization subsystem 22.

In one embodiment, to compute the Visible light Communication (VLC) channel gain for each of the one or more Light Emitting Diode (LED), the optimal power allocation subsystem 24 computes the overall Visible light Communication (VLC) channel gain. In such embodiment, the overall Visible light Communication (VLC) channel gain refers to sum of both LoS path and NLOS path reflected by the walls within the room. Here, the LoS path signifies the Line-of-Sight path and NLOS path signifies the Non-Line-Of-Sight path.

Figure 2:
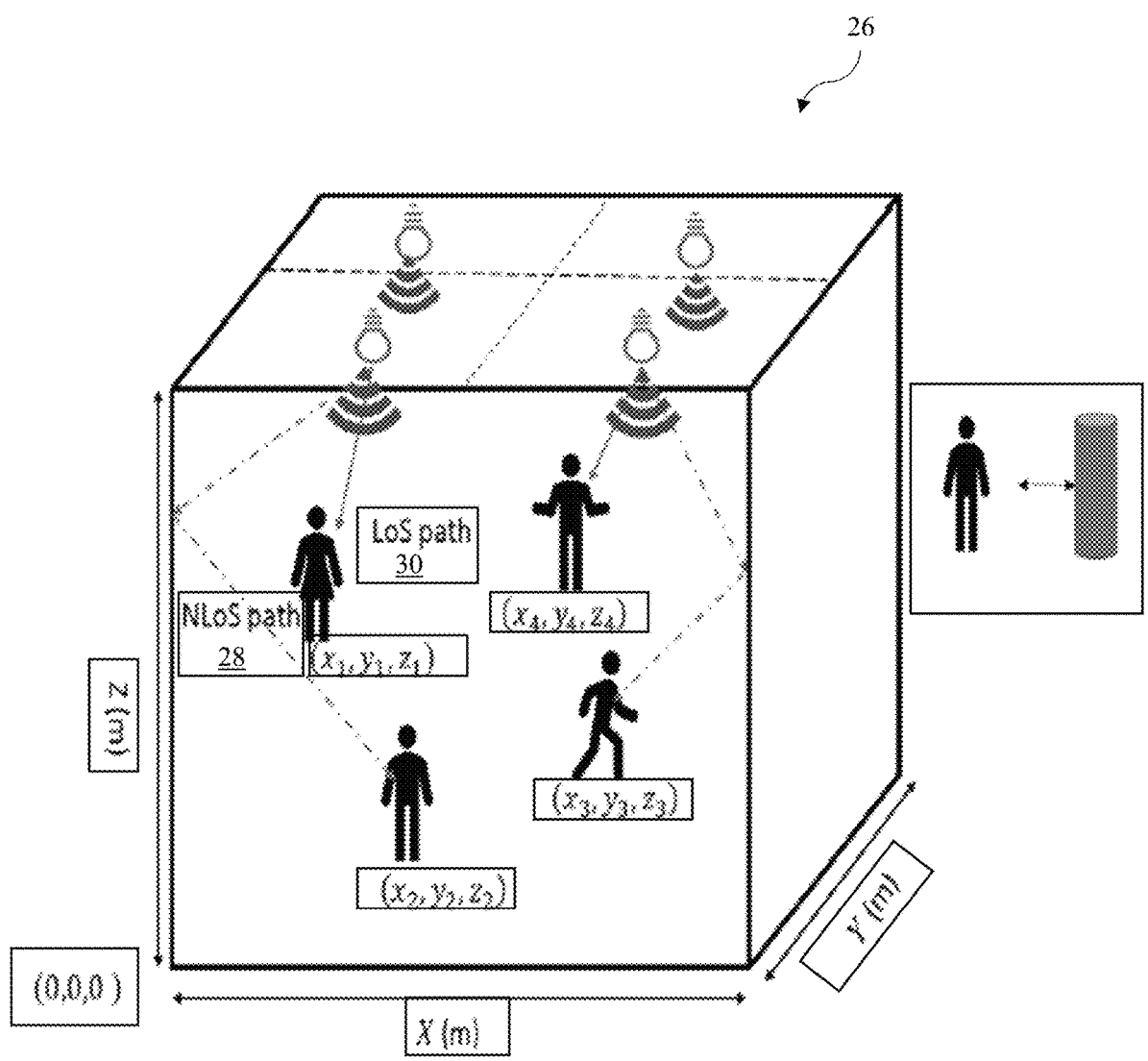
FIG. 2 is a block diagram of a room tailored with Indoor Visible light positioning system along with human blockages in accordance with an embodiment of the present disclosure.
Figure 3:
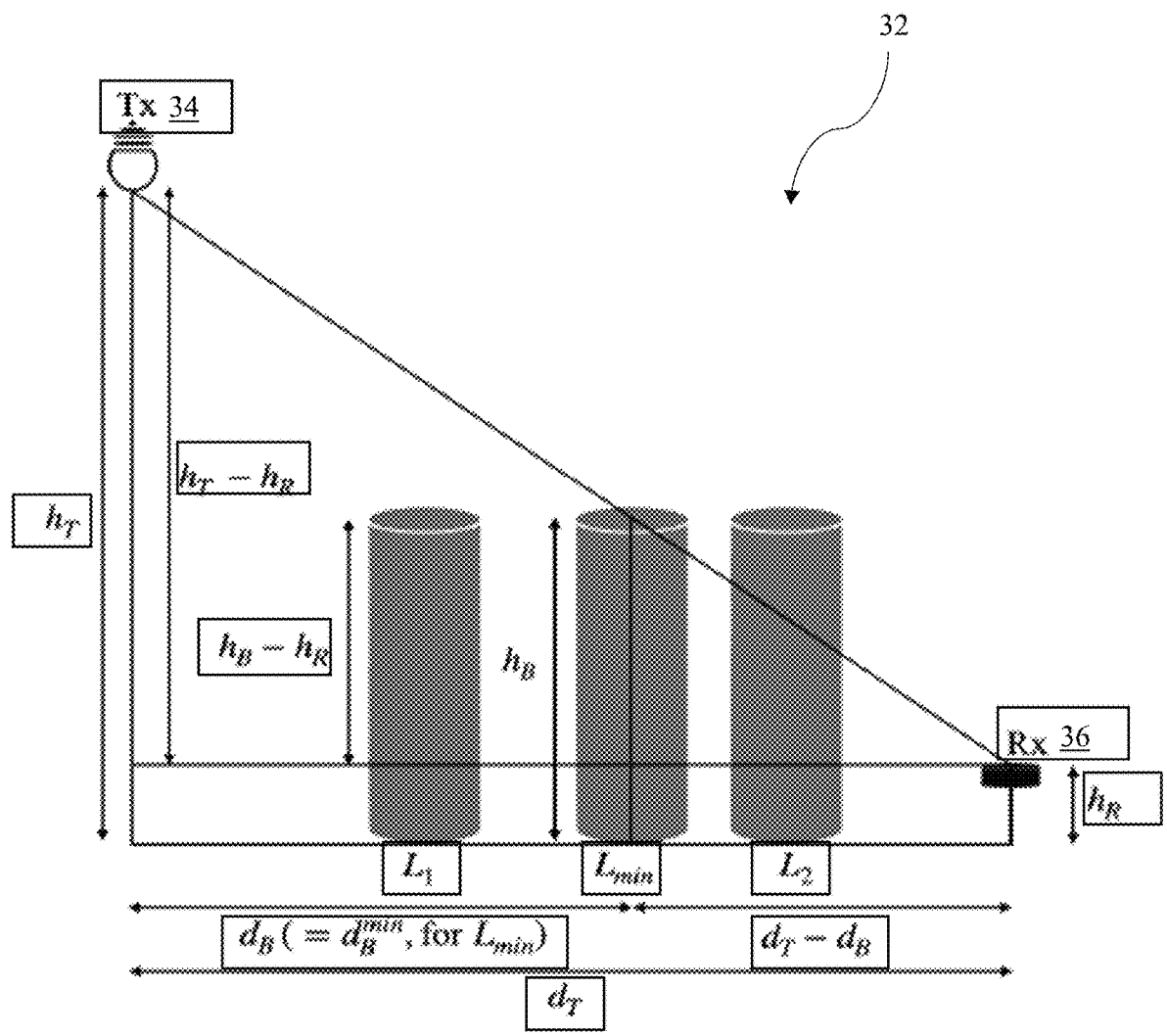
FIG. 3 is a graphical representation of the room with human blockages in accordance with an embodiment of the present disclosure.

The optimal power allocation subsystem 24 is also configured to optimize the power allocation framework to achieve maximized visible light communication (VLC) data rate based on the computed visible light communication (VLC) channel gain and one or more constraints. In such embodiment, the one or more constraints comprises predefined sum of power for each of the one or more light emitting diode (LED), pre-defined BER, a predefined range of illumination and non-negative power for each of the one or more light emitting diodes (LED). FIG. 2 & FIG. 3 description with an exemplary situation explains the whole process of optimizing the power allocation framework.

FIG. 2 is a block diagram of a room 26 tailored with Indoor Visible light positioning system along with human blockages in accordance with an embodiment of the present disclosure. In such embodiment, the human blockages are modelled as a cylinder of height $h_B$ and radius $r_B$. For the given room, the blockages of different widths (radius $r_1$ and $r_2$) have been considered to replicate the different sizes of human beings. In one embodiment, the computing system 10 may also consider the blockages in random location, to find the accurate optimized power allocation framework.

In one specific embodiment, one or more detected blockages are simulated as per requirement within the room by the blockage generalization subsystem 22. In such exemplary embodiment, the optimal power allocation subsystem 24 is configured to use Lambertian model to precisely replicate both the Line-of-Sight (LoS) and Non-Line-of-Sight (NLoS) light intensity transmitted by Light Emitting Diode (LED). The multipath Visible Light Communication (VLC) channel gain is a sum of both the LoS path (direct path between the Light Emitting Diode (LED) and the user) and the NLOS path reflected by the walls.

Equation 1 showcase the channel gain of Line-of-Sight (LoS) component $H_{LoS}$. Whereby m represents Lambertian order.

$$H_{LoS} = \begin{cases} \frac{(m+1)A}{2\pi D^2}\cos^m(\phi)T_s g(\psi)\cos(\theta) & 0 \leq \Psi \leq \Psi_c, \end{cases} \quad \text{Equation 1}$$

Equation 2 showcase the channel gain of Non-Line-of-Sight (NLoS) component $H_{NLoS}$.

$$H_{NLoS}^{wall} = \begin{cases} \frac{\rho(m+1)A}{2\pi D_1^2 D_2^2}\cos^m(\phi)T_s(\psi)g(\psi)\cos(\alpha_{wall})\cos(\beta_{wall}) & 0 \leq \Psi \leq \Psi_c \end{cases} \quad \text{Equation 2}$$

In equation 1 and equation 2, A represents the physical area of the PD, $\theta$ is the angle of incidence to the PD from Light Emitting Diode (LED), $\phi$ is the LED angle of irradiance, $\Psi_c$ is the receiver FOV, $T_s(\psi)$ is the optical filter's gain, $D_d$ is the distance between the VLC transmitter (LED) and the receiver (PD), m is Lambertian order and $g(\psi)$ (Equation 3) is the optical concentrator's gain.

Here $\alpha_{wall}$ and $\beta_{wall}$ are the incidence and reflectance angle Non-Line of sight link make with reflecting surface (wall) have reflection coefficient $\rho$. D1, D2 are the distance travelled by the Non-Line of Sight (NLoS) link to reach the user from the wall.

The optical concentrator's gain (equation 3) can be represented as:

$$g(\psi) = \begin{cases} \frac{n^2}{\sin^2(\Psi_c)}, & 0 \leq \Psi \leq \Psi_c, \end{cases} \quad \text{Equation 3}$$

The total received power using multiple Light Emitting Diodes (LED) including both Line-of-Sight (LoS) as well as Non-Line-of-Sight (NLoS) path through the walls for a given transmission power ($P_T$), can be expressed as Equation 4.

$$P_r = \sum_{i=1}^{N}\left[P_T H_{LoS} + \sum_{k=1}^{K} P_T H_{NLoS}\right] \quad \text{Equation 4}$$

In another such exemplary embodiment, the optimal power allocation subsystem 24 is configured to use Matern Hard Core Process (MHCP) to generate multiple objects in an indoor environment. Hard-Core processes are point processes where point is not allowed to be closer than a certain minimum distance. Thus, the Hard-Core processes are more regular (less clustered) than other point processes. Moreover, the Hard-Core processes realistically emulate real-life scenarios where objects have a finite width and cannot occupy the same space. The intensity at parent point process is given in equation 5.

$$\lambda_{BI} = \frac{1 - \exp(\lambda_p \pi \delta^2)}{\pi \delta^2}. \quad \text{Equation 5}$$

In another embodiment, to compute the Visible light Communication (VLC) channel gain for each of the one or more Light Emitting Diodes (LED), the optimal power allocation subsystem also computes the shadowing effect for static and dynamic blockages based on the Matern Hard Core Process (MHCP) and random waypoint (RWP) model.

The employed MHCP model has also been conventionally used to plan the deployment and modeling of blockages and interference calculations in wireless and VLC networks. Similarly, the RWP mobility model is a simple stochastic model that describes a human blockage's movement behaviour in a given room.

In yet another exemplary embodiment, the optimal power allocation subsystem 24 considers the shadowing effect for static and dynamic blockages. FIG. 3 is a graphical representation 32 of the room with human blockages in accordance with an embodiment of the present disclosure. In such embodiment, whenever a blockage pauses in the Line-of-Sight (LoS) path between any $T_x$ (34) and the $R_x$ 36, a shadow of that blockage will be formed. In such exemplary embodiment, humans are considered as cylindrical shape as the shape facilitates the analytical tractability of the model. Since the blockages are cylindrical, assumed shadow is rectangular. In one specific embodiment, if the length of the shadow is long enough to fall on the receiver, there may be a communication link blockage between that particular $T_x$ 34 and $R_x$ 36.

In such exemplary embodiment, the probability that the centre of at least one blocking object falls in the shadow area can be calculated using the void probability. The human blockage between the Light Emitting Diode (LED) and the PD at distance d with probability PB(d), the VLC channel gain with blockage can be expressed as equation 6:

$$H_{i,j}^B = H_{ij}[(1 - P_B(d))] \quad \text{Equation 6}$$
$$= \frac{M[\exp(-2\lambda_B d_{i,j} r_B^2)]}{2\pi d_{i,j}^2},$$

where $M = (m+1)\cos^m(\phi) A \cos(\theta)$.

The optimal power allocation subsystem 24 is similarly configured to maximize the average bit rate among the users subject to the illumination and BER constraints. In one embodiment, the one or more constraints comprises predefined sum of power for each of the one or more Light Emitting Diode (LED), pre-defined BER, a predefined range of illumination and non-negative power for each of the one or more Light Emitting Diode (LED).

The average bit rate is the function of the average received signal-to-noise ratio (SNR) at the receiver in the presence of human blockages. The average bit rate is maximized by optimally allocating the transmit power $P_{ti}$ among Light Emitting Diodes (LEDs) and can be expressed as equation 7.

$$\max_{P_{ti}} \log_2 \left[ 1 + \mathbb{E} \left[ \frac{\left(\mathcal{R} \sum_{i=1}^{N} H_{i,j}^B P_{ti}\right)^2}{\sigma_j^2} \right] \right]. \quad \text{Equation 7}$$

In equation 7, $H_{i,j}^B$ is the Visible Light Communication (VLC) channel coefficient between $i^{th}$ Light Emitting Diode (LED) and $j^{th}$ PD in the presence of human blockages and $\sigma_j^2$ is the noise variance at $j^{th}$ PD.

The average bit rate is subjected to the one or more constraints. In one such embodiment, the constraint is that sum of power of each Light Emitting Diode (LED) is upper bounded by $P_T$ as expressed in equation 8.

$$\sum_{i=1}^{N} P_{ti} \leq P_T, \Rightarrow 1_N x \leq P_T. \quad \text{Equation 8}$$

where, $1_N$ is a N dimensional unit vector and $x = [P_{t1}; \ldots P_{tN}]^T$ is N dimensional column vector of decision variables.

In another embodiment, the constraint is that power of each LED is non-negative. In yet another embodiment, BER should be $P_e \leq 10^{-3}$, as shown in Equation 9.

$$Q\left(\sqrt{\frac{\left(\mathcal{R}\sum_{i=1}^{N} H_{i,j}^B P_{ti}\right)^2}{\sigma_j^2}}\right) \leq 10^{-3}. \quad \text{Equation 9}$$

In one embodiment, the illumination across the room must be within a predefined range. The predefined range is given in equation 10.

$$1500 \; lux \geq \left[\frac{P_{ti} \cos^{m+1}(\phi)\cos(\theta)}{4\pi r^2}\right] \geq 300 \; lux \quad \text{Equation 10}$$

It is pertinent to note, second term inside the log function in optimization function (equation 7) is the expected SNR at the receiver in the presence of blockage and can be calculated and expressed as equation 11.

$$\mathcal{R}^2 \left[ \frac{\sum_{i=1}^{N} \mu_{i,i}^B P_{ti}^2 + 2\sum_{i=1}^{N}\sum_{q=i+1}^{N} \mu_{i,q}^B P_{ti} P_{tq}}{K\sigma_j^2} \right]. \quad \text{Equation 11}$$

By substituting the value of received SNR in (equation 7) the average data rate for Nu users can be expressed as equation 12.

$$\log_2\left[1 + \frac{\left(\mathcal{R}\sum_{i=1}^{N} H_{i,j}^B P_{ti}\right)^2}{\sigma_j^2}\right] = \log_2\left[1 + \mathcal{R}^2 \mathbb{E}\left[\left(\frac{P_{rj}}{\sigma_j^2}\right)^2\right]\right] = \quad \text{Equation 12}$$

-continued $$\frac{1}{N_u}[P_{t_i}, \ldots, P_{t_N}]\begin{bmatrix} \beta_{11} & \cdots & \beta_{1N} \\ \cdot\cdot & \cdot\cdot & \cdot\cdot \\ \beta_{N1} & \cdot\cdot & \beta_{NN} \end{bmatrix}\begin{bmatrix} P_{t_1} \\ \cdot\cdot \\ P_{t_N} \end{bmatrix}$$

Using equation 7 and equation 12, the proposed optimization function can be expressed in matrix form as equation 13.

$$\max_{x} \frac{1}{N_u} x^T Bx, \quad \text{Equation 13}$$

In equation 13, where the matrix B is given by equation 14.

$$B = \begin{bmatrix} \beta_{1,1} & \cdots & \beta_{1,N} \\ \cdot\cdot & \cdot\cdot & \cdot\cdot \\ \beta_{N,1} & \cdot\cdot & \beta_{N,N} \end{bmatrix}. \quad \text{Equation 14}$$

Here, the equation 12 is convex because B is positive definite in nature. Also, the linear functions are both convex and concave, and all constraints are convex. Therefore, the optimization problem in (equation 7) gives a quadratic and the convex optimization problem.

The computing system 10 also includes optimization power saving computation subsystem. The optimization power saving computation subsystem is configured to compute the power saved by subtracting the value equal power allocation to each of the one or more Light Emitting Diodes (LEDs) from the optimized allocated power to each of the one or more Light Emitting Diodes (LEDs). Such calculations fulfils both illumination and BER constraints. Average BER should be $\leq 10^{-3}$. The illumination across the room should be 1500 lux$\geq I_{avg} \geq$300 lux.

The computing system 10 analyses the BER of the visible light communication (VLC) channel in the presence of dynamic blockages characterized by MHCP. The BER for OOK modulation scheme with the optimal LED power allocation with human blockages can be expressed as:

$$P_eQ = \left(\frac{\mathcal{R}C_1 \sum_{i=1}^{N} V_i}{\sigma_j}\right). \quad \text{Equation 15}$$

In such analysing process, to calculate the blockage probability $P_B(d_B)$, the computing system 10 assumes that no signal is received whenever the PD is blocked by the obstacle. The optical signal $s_i(t)$ transmitted by the $i_{th}$ Light Emitting Diode (LED) is given as shown in equation 16.

$$s_i(t)=P_{t_i}[1+M_I x_i(t)] \quad \text{Equation 16}$$

In such embodiment, where $P_{ti}$ is the $i_{th}$ Light Emitting Diodes (LED's) the transmit power, $M_I$ is the modulating index and $x_i(t)$ is the corresponding OOK modulated signal. The first term in equation 16, ($P_{ti}$) accounts for the illumination whereas the second term ($P_{ti}M_I x_i(t)$) accounts for the communication part. In such embodiment, the DC component of the detected electric signal is filtered out at the Rx after photo detection. yj is the received signal at the photodetector j, and is expressed as shown in equation 17.

$$y_j = RP_{r_j} + n_j \quad \text{Equation 17.}$$

Here, R is the responsivity of the PD and $n_j$ is the additive white Gaussian noise (AWGN) with zero mean and $\sigma^2 j$ variance. In this equation 17, $$|P_{r_j}| = C_1 \sum_{i=1}^{N} V_i,$$

$$C_1 = \frac{P(m+1)Ah_T^{m+1}}{2\pi}$$

$$V_i = \frac{B_i x_i \left[\exp(-2\lambda_B d_{i,j} r_B^2)\right]}{\left(\sqrt{h_T^2 + r_i^2}\right)^{m+3}}$$

In one exemplary implementation, the computing system 10 is applied to a proposed indoor Visible Light Communication (VLC) system inside a standard room of 5 m*5 m*3 m and 10 m*10 m*3 m. Each room consists of either 4 or 8 Light Emitting Transmitters (LED) placed in a rectangular geometry. The computing system 10 is provided with parameters corresponding to one or more light emitting diodes (LED), one or more visible light communication (VLC) transmitters and one or more visible light communication (VLC) receivers.

For example, the parameters may include transmitted power $P_T$ of 200 mw, refractive index of 1.5, optical filter gain of 1, wall reflection of 0.8 and the like. The computing system 10 is provided priorly with such parameters.

Figures 4A, 4B, 4C:
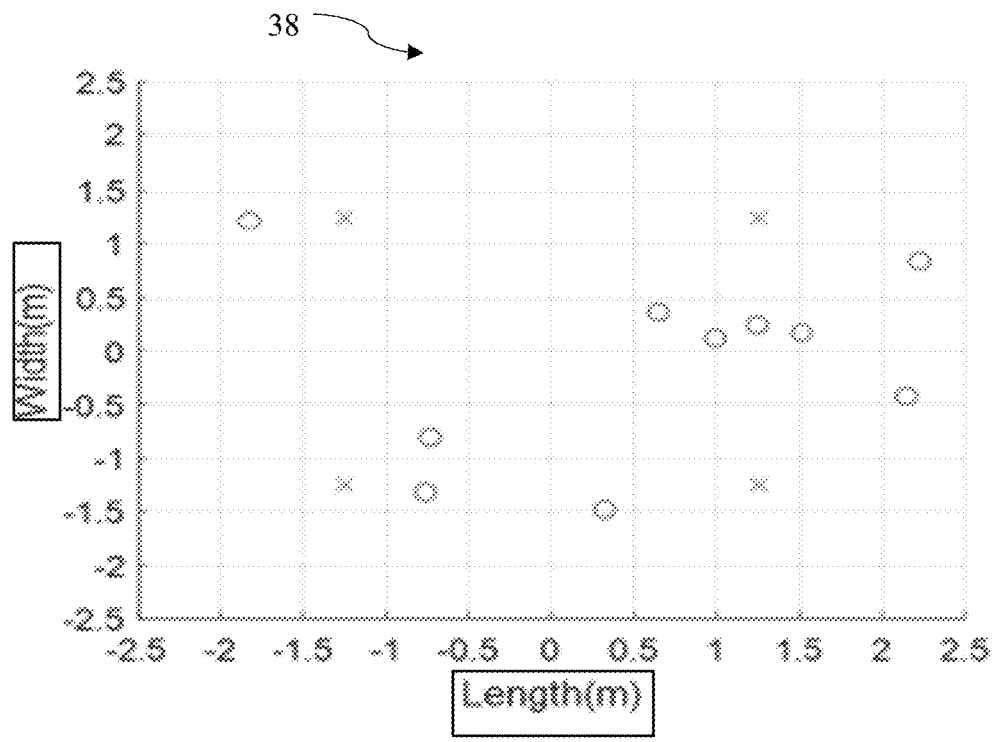
FIG. 4A showcase the implementation of the 4 Light Emitting Diode within a room filled with objects acting as blockages.
FIG. 4B is a tabular information of localization error with respect to each power allocation vector.
FIG. 4C represents optimum power allocation output for each Light Emitting Diode.

FIG. 4A showcase the implementation of the 4 Light Emitting Diode 38 within a room filled with objects acting as blockages. For the exemplary implementation, a thin object is if radius 0.005 m and Linear Regression is applied to the implementation to develop a predictive algorithm to obtain the location and height of the object. Initially, when no information about the location of the object is available, power is allocated equally to all the Light Emitting Diodes.

In one embodiment, the localization error in each Light Emitting Diode (LED) present within the room is calculated while keeping the total power assigned to one particular Light Emitting Diode while leaving the other 3 Light Emitting Diodes with no power. FIG. 4B is a tabular information 40 of localization error with respect to each power allocation vector.

FIG. 4C represents optimum power allocation output 42 for each Light Emitting Diode. In such exemplary embodiment, more power is applied to Light Emitting Diode, giving the minimum localization error. Power is assigned with the help of power allocation algorithm. In such exemplary implement data as provided in FIG. 4 B& C, the computing system 10 do not allocate more power to the Light Emitting Diode around which some objects are clustered, the power allocation algorithm allocates more power to the Light Emitting Diode from which the average distance of all the objects is lesser. The optimization algorithm resulted in an average net improvement of 22.068% (6-9 cm) in location accuracy.

Figure 5:
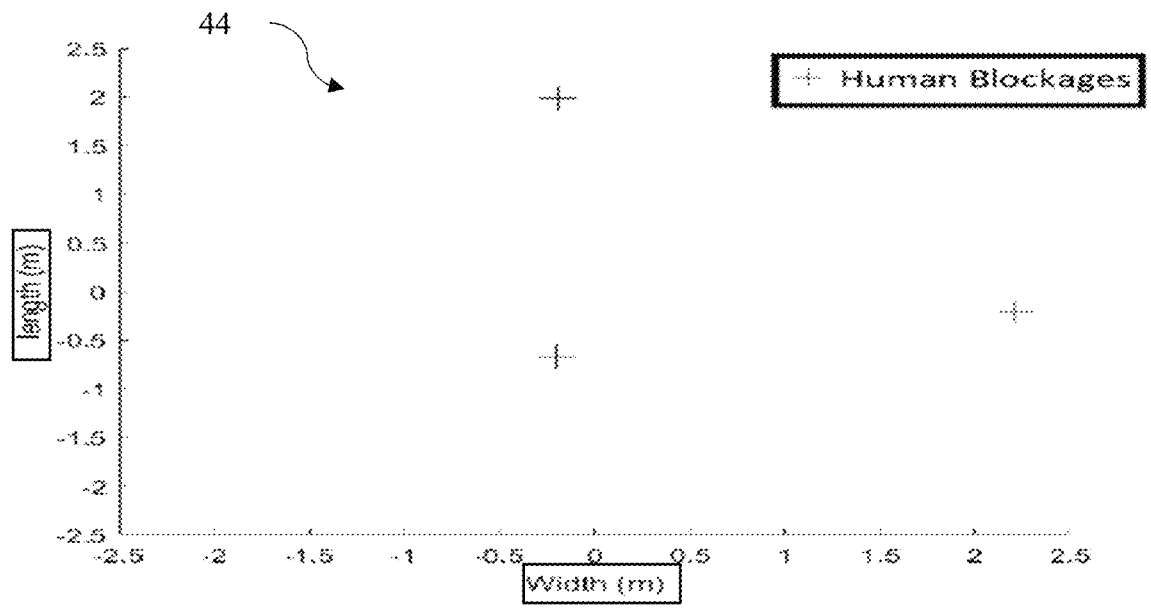
FIG. 5A & B showcase the realization of 3 human blockages and their respective power subject to the total power constraint of 2 W, which is distributed among 4 LEDs using optimal LED power allocation.
Figure 5:
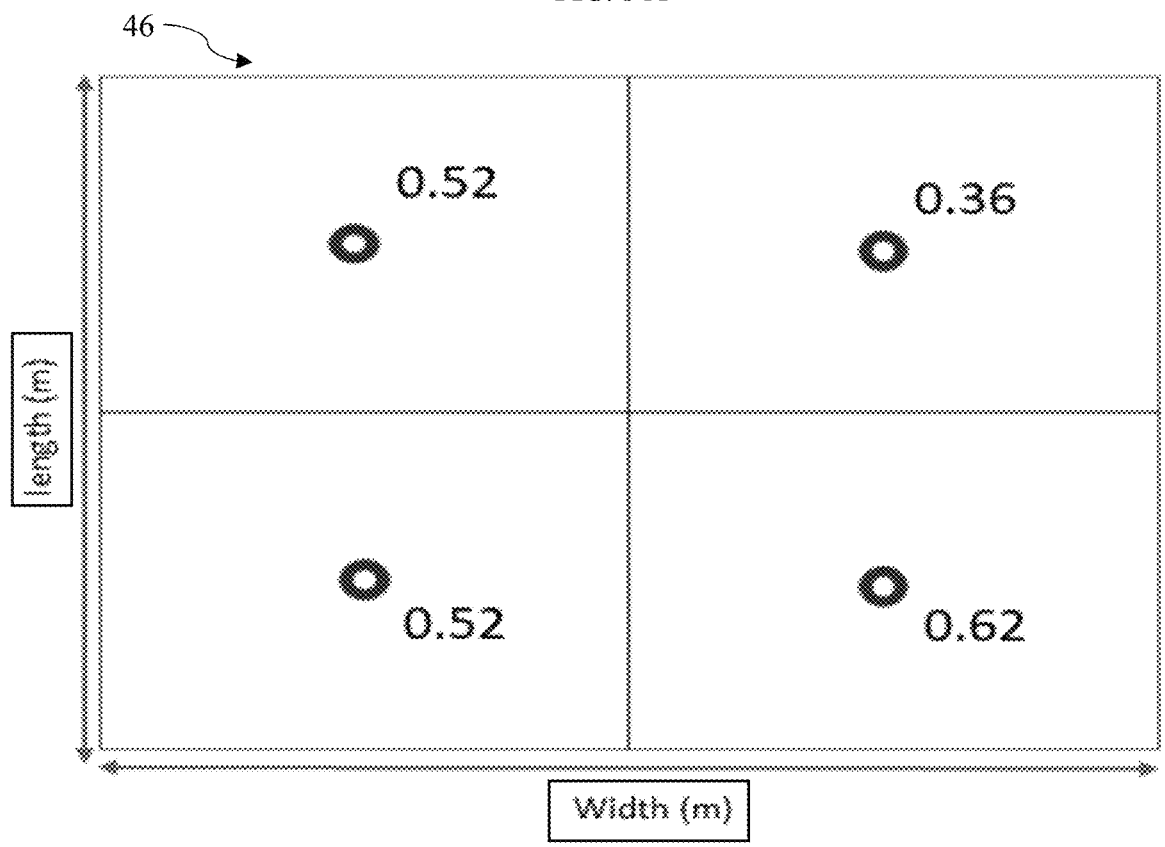
Figure 6:
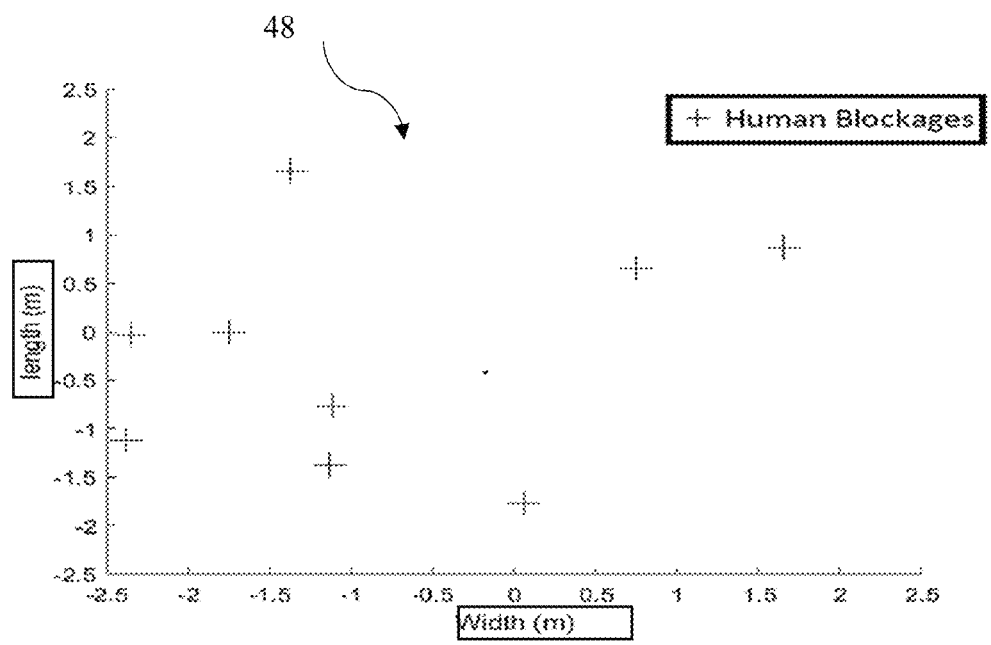
FIG. 6A & B showcase the realization of 9 human blockages and their respective power allocation.
Figure 6:
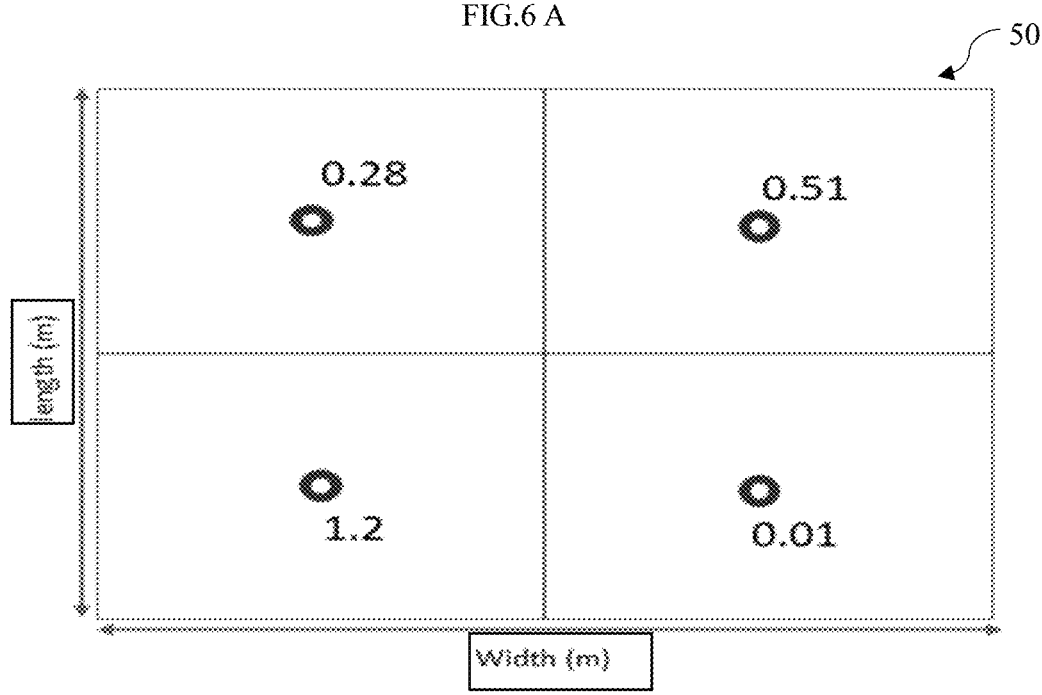

FIG. 5A & B showcase the realization of 3 human blockages 44 & 46 and their respective power subject to the total power constraint of 2 W, which is distributed among 4 LEDs using optimal LED power allocation. In such realization, "+" represents humane blockages. FIG. 6A & B showcase the realization of 9 human blockages and their respective power allocation. The graphical representation clearly shows that depending on the location of the human blockages, the respective Light Emitting Diode power varies in order to fulfil illumination requirement and BER constraints. For example, FIG. 6A & B shows, 6 blockages 48 & 50 are clustered near the 3rd Light Emitting Diodes attocell, and the allotted power to the respective LED is 1.2 W. Light Emitting Diodes attocell has more blockages the any other Light Emitting Diodes attocell within the room so more power is allocated.

Figure 7:
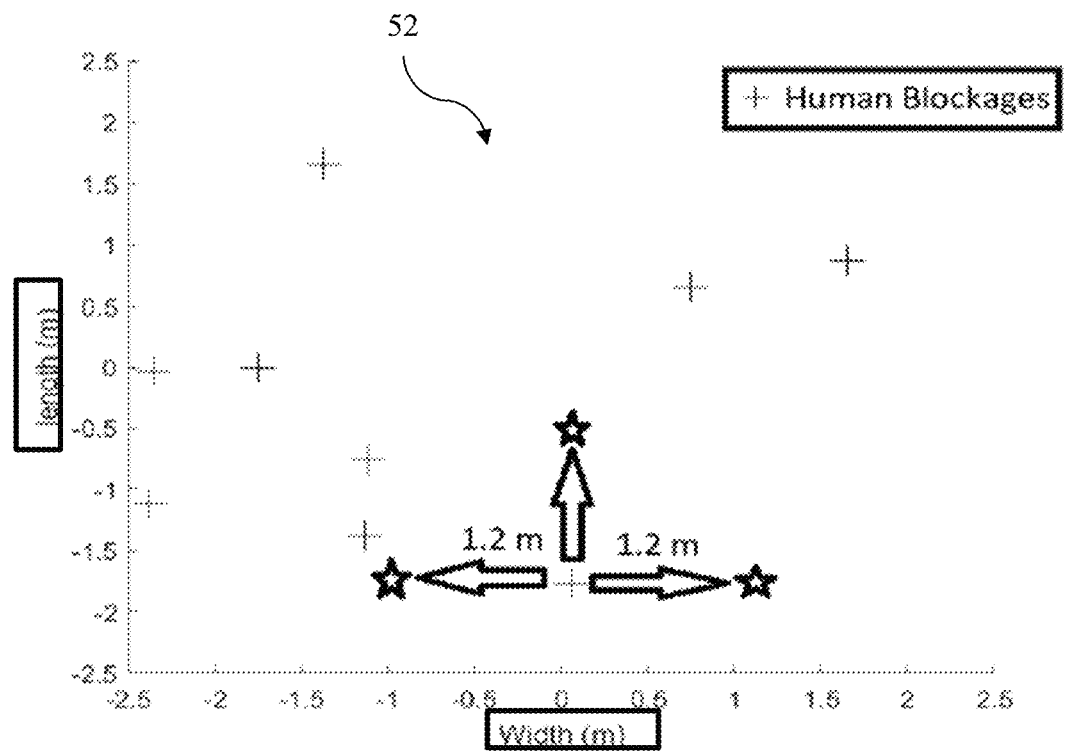
FIG. 7A& B showcase the change in allocated optimal Light Emitting Diode (LED) power allocation values due to a shift in blockage location.
Figure 7:
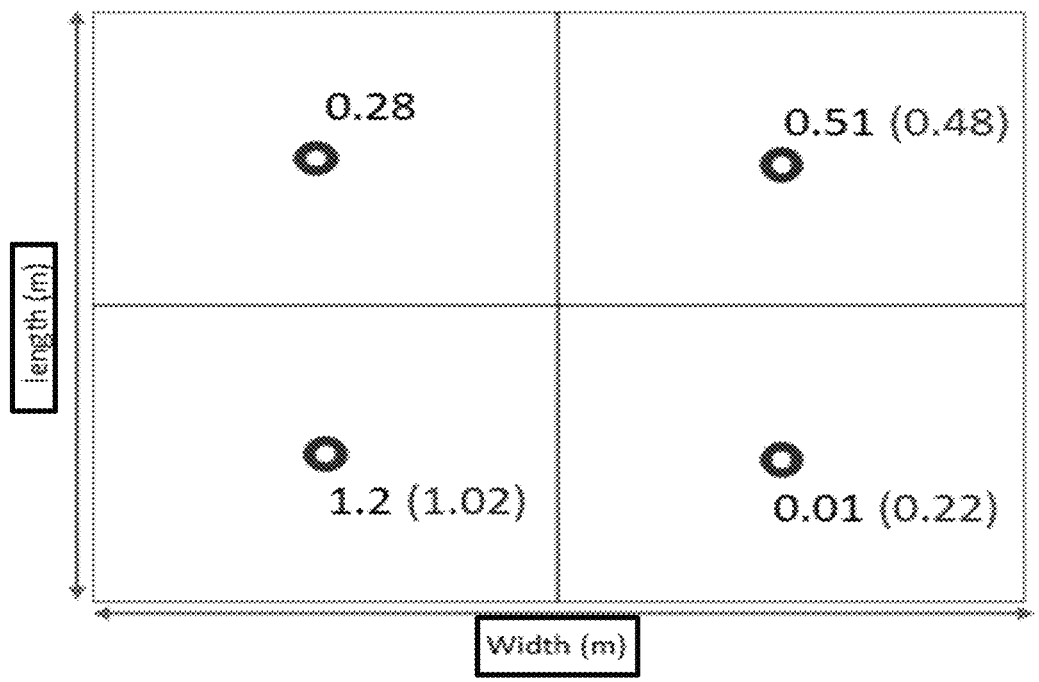

FIG. 7A & B showcase the change in allocated optimal Light Emitting Diode (LED) power allocation values 52 & 54 due to a shift in blockage location. In such embodiment, the primary objective is to find the maximum allowed shift in blockage location that will not alter the current Light Emitting diode (LED) power allocation which depends on the current location of the blockage as well as the minimum distance required to move out of the coverage area of the respective Light Emitting Diode attocell. FIG. 7A showcase the maximum allowed shift for a given blockage realization is found to be 120 cm.

Figure 8:
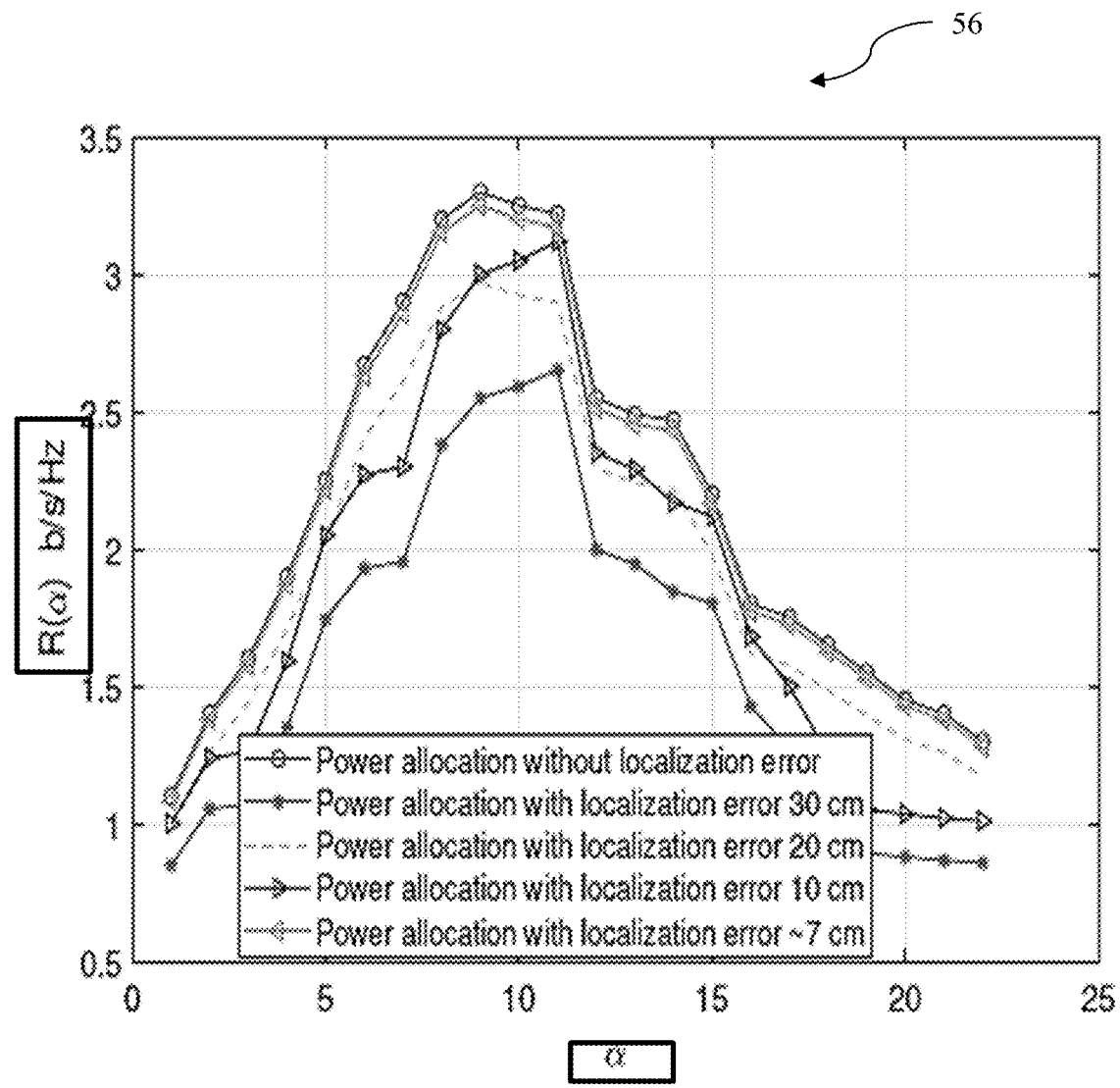
FIG. 8 showcase the maximum achievable average data rate for the proposed optimization framework for the given realization of human blockages as shown.

FIG. 8 shows the maximum achievable average data rate 56 for the proposed optimization framework for the given realization of human blockages as shown. The index number of all possible solutions has been chosen such that the maximum average data rate is achieved. In such exemplary embodiment, as the localization error increases, the maximum achievable data rate decreases as the decrease results in less accurate estimation of the blockage, which will affect the proposed optimization solution. Therefore, in a room of 4 LEDs configuration with nine blockages in a room size of 5 m*5 m*3 m, the maximum allowed localization error is 7 cm with the maximum achieved data rate of 3.28 b/s/Hz. Further, if localization error increases, the achieved data rate decreases. For example, for the localization error of 10 and 20 cm, the maximum achieved data rate reduces to 3.1 and 2.85 b/s/Hz respectively.

Figure 9:
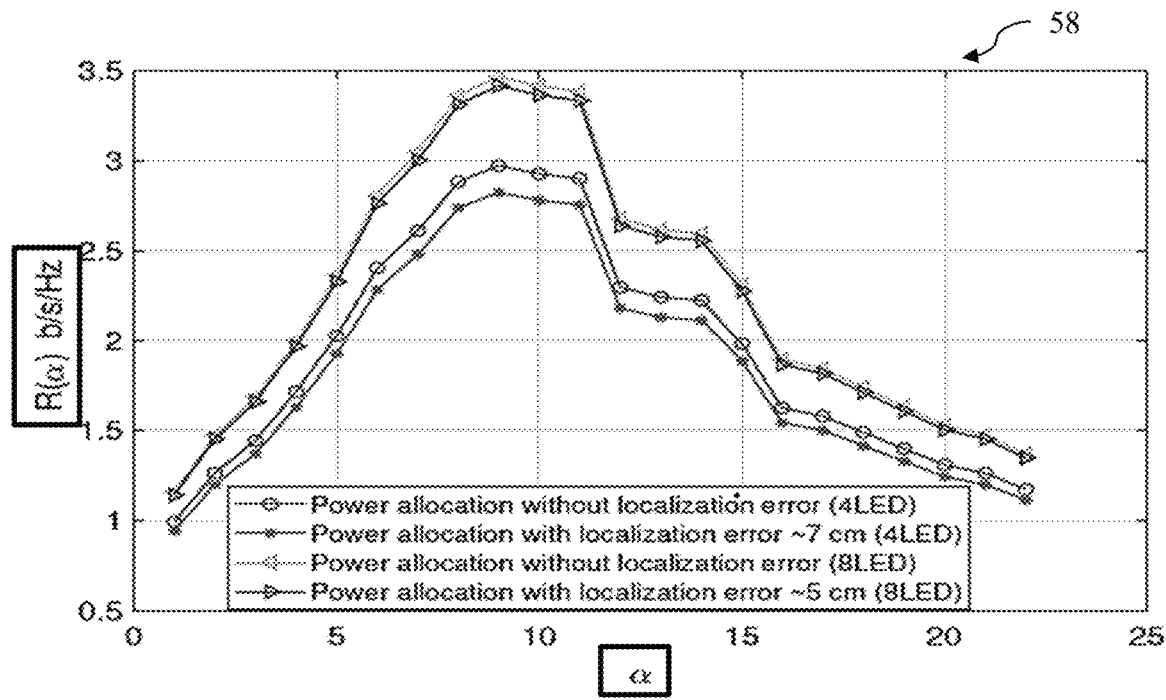
FIG. 9 B showcase the average achieved data rate for a room size of 10 m*10 m*3 m with 4 and 8 LEDs.
Figure 9:
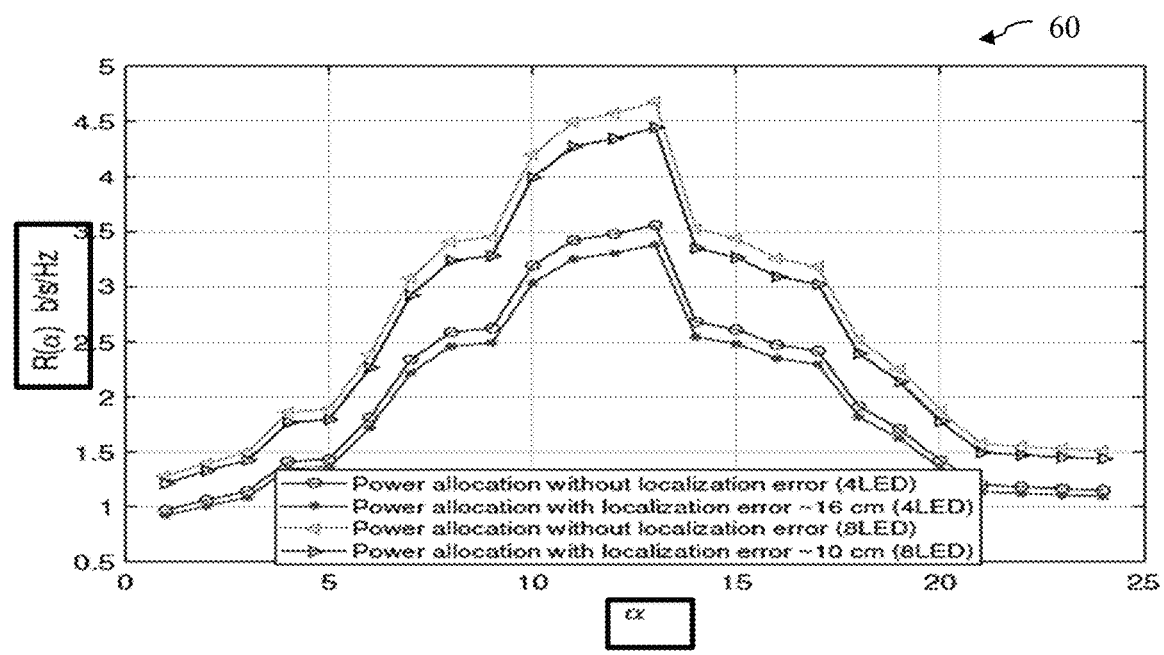

FIG. 9A shows the average achieved data rate 58 for a room size of 5 m*5 m*3 m with 4 and 8 LEDs. As the number of LEDs increases from 4 to 8 LED, the respective maximum allowed localization error decreases from 7 cm to 5 cm. This reduction in localization error is due to the fact that with an increase in the number of LEDs, the separation between the two LEDs decreases the attocell coverage area. FIG. 9 B shows the average achieved data rate 60 for a room size of 10 m*10 m*3 m with 4 and 8 LEDs. It can be observed that the maximum allowed localization error value increases due to increased separation between two LEDs with an increase in room size. The maximum allowed localization error for 4 LED and 8 LED cases are 16 cm and 10 cm respectively. Therefore, the increase in the number of LEDs will results in a decrease in the maximum allowed localization error with an increase in average data rate. While with the increase in room dimension, the maximum allowed localization error increase for the same number of LEDs with a decrease in the maximum achievable average data rate.

Figure 10:
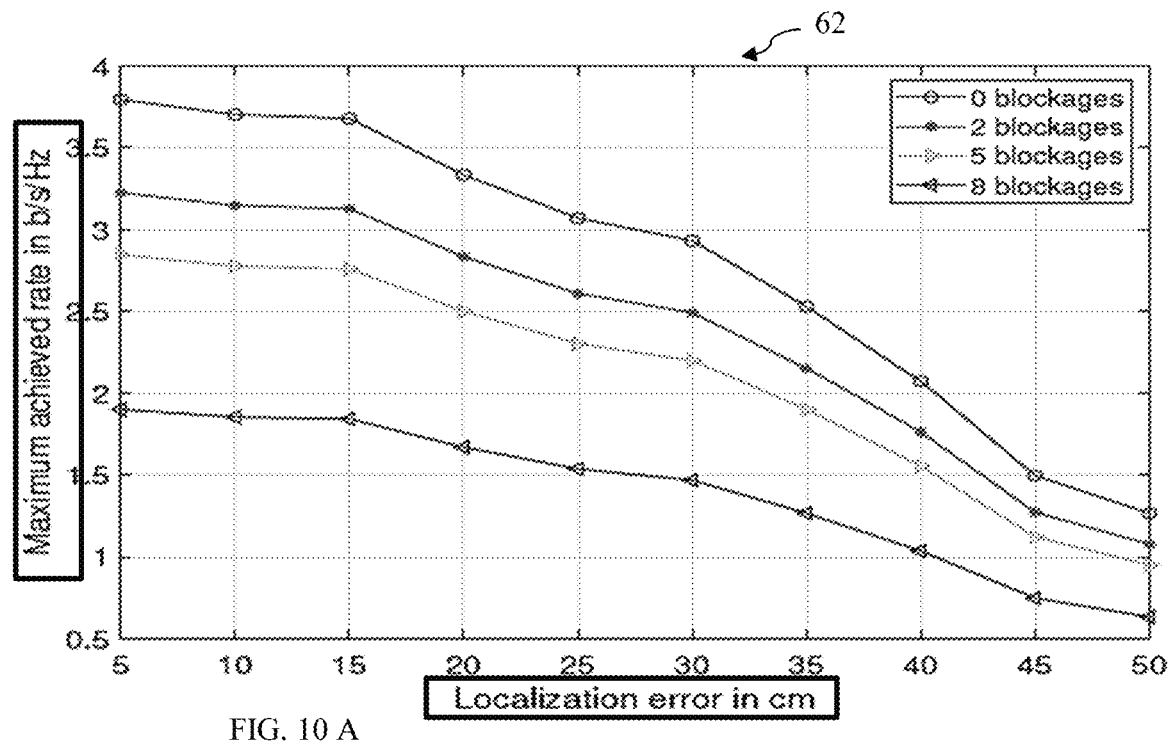
FIG. 10 showcase the maximum achievable data rate as a function of localization error for increasing number of blockages for 4 and 8 LED configurations.
Figure 10:
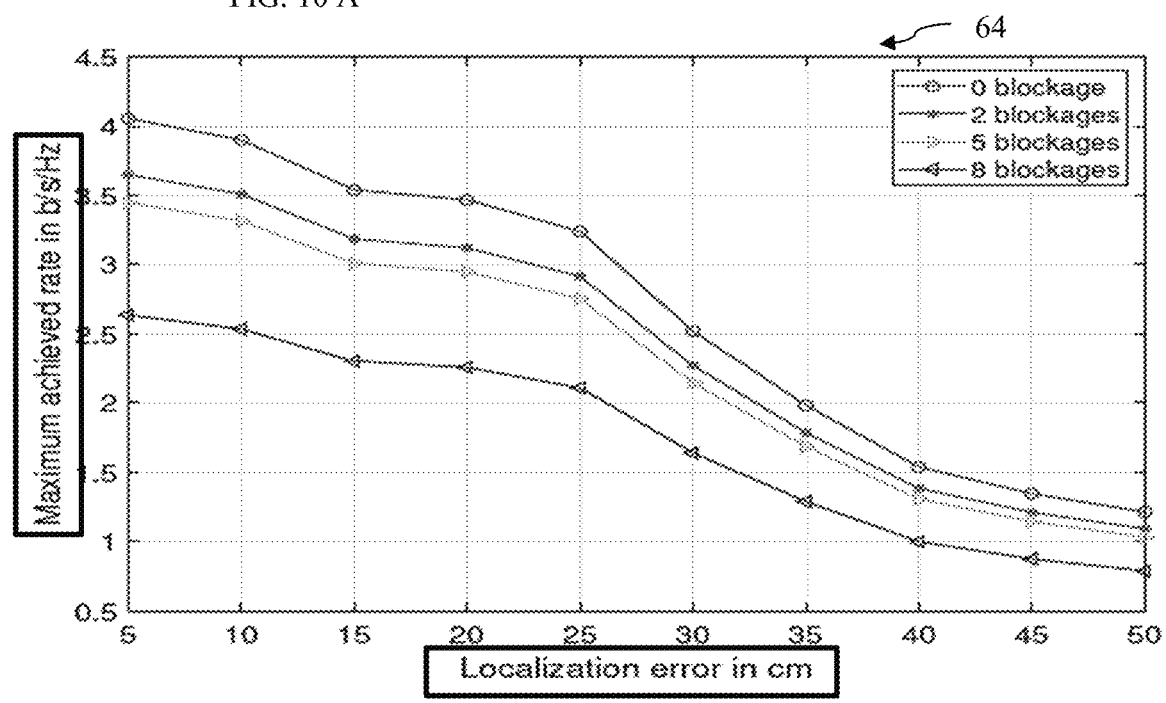

FIG. 10 showcases the maximum achievable data rate as a function of localization error for increasing number of blockages for 4 and 8 LED configurations. As the number of human blockages increases, the maximum achievable data rate decreases along with maximum localization error for 4 LED configuration 62 as shown in FIG. 10A. For example, with 2 blockages and an allowed localization error of 5 cm, the maximum achieved data rate is 3.25 b/s/Hz. For the same number of blockages with an increase in localization error to 20 cm, the maximum achieved data rate is reduced to 2.75 b/s/Hz. Similarly, in FIG. 10 B with 8 LED configurations 64, the effect is nearly the same. Any person skilled in the art observes that with 2 blockages and with allowed localization error of 5 cm, the maximum achievable data rate is 3.65 b/s/Hz, while for the same number of blockages and increase in localization error to 20 cm, the maximum achievable data rate reduces to 3.05 b/s/Hz.

Figure 11:
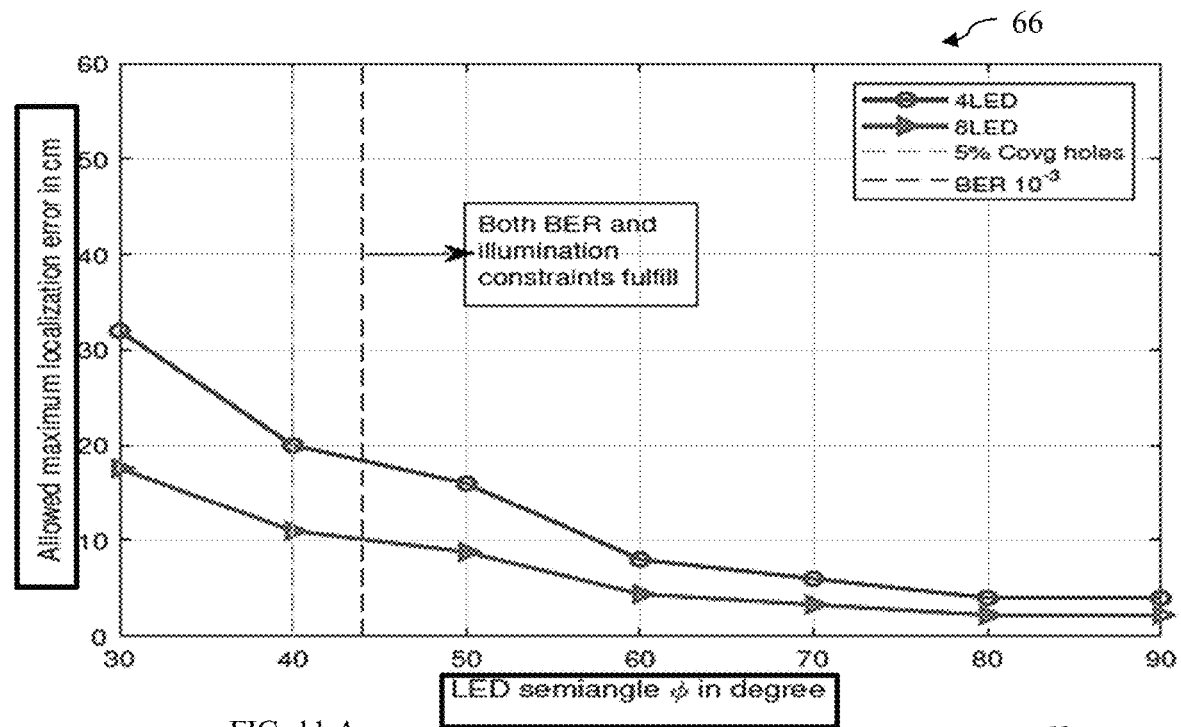
FIG. 11A&B showcase the maximum allowed localization error with 4 and 8 LEDs for a room size of 5 m*5 m*3 m and 10 m*10 m*3 m respectively.
Figure 11:
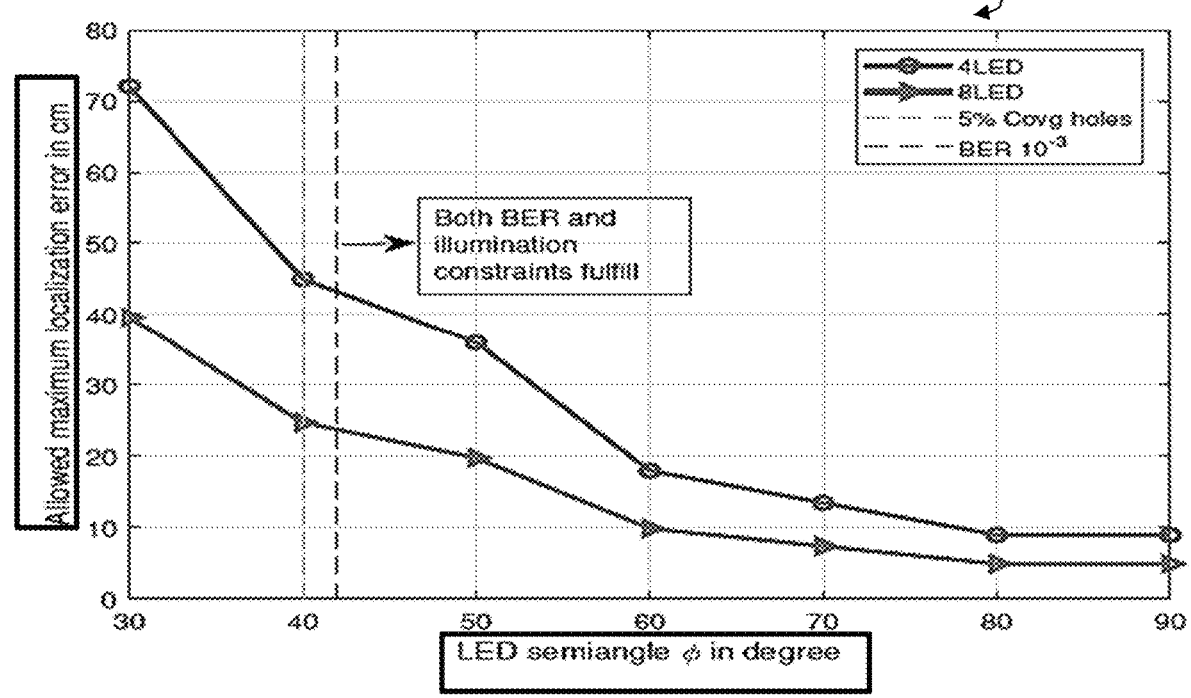

FIG. 11A&B showcase the maximum allowed localization error with 4 and 8 LEDs 66 & 68 for a room size of 5 m*5 m*3 m and 10 m*10 m*3 m respectively. In both cases, the maximum allowed localization error decreases with an increase in LED semi angle. For the case of 5 m*3 m room size, the minimum required LED semi angle is 44 with maximum allowed localization error of 10 cm and 18 cm while maintaining the illumination and BER constraints for 4 and 8 LEDs respectively. Similarly, for the case of room size of 10 m*10 m*3 m minimum required LED semi angle is 42.8 degree with maximum allowed localization error of 22 cm and 43 cm for 4 LED and 8 LED respectively.

Figure 12:
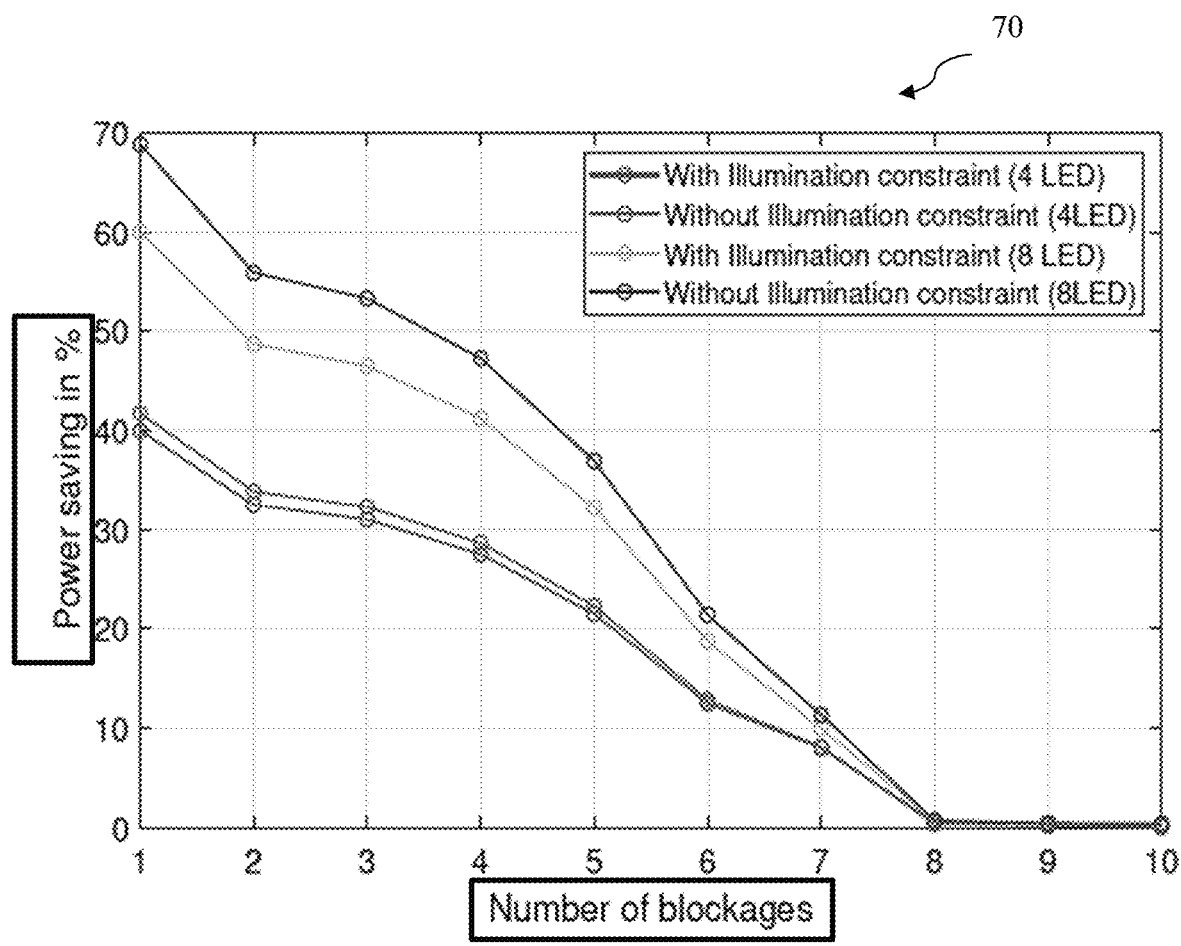
FIG. 12 B showcase the achieved BER with respect to the dimming percentage for 4 and 8 LEDs with 5 blockages.
Figure 12:
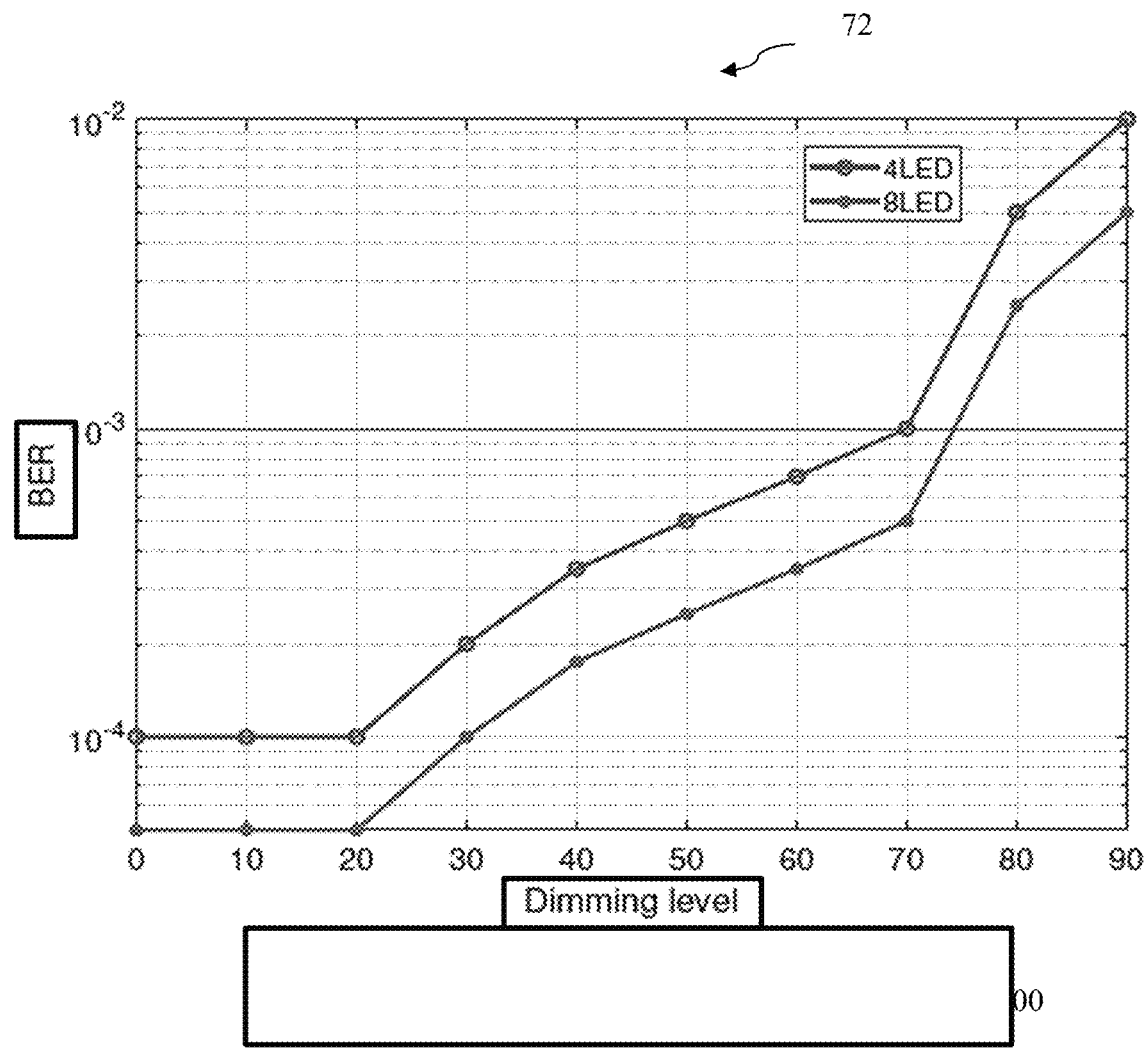

FIG. 12A shows the power saving 70 with varying number of human blockages for with and without illumination constraints for the optimization problem. For 4 LED case with one blockage, the maximum power saving achieved with and without illumination constraint is nearly the same which is approximately 40%. Further, the power saving decreases with an increase in the number of blockages. FIG. 12 B shows the achieved BER 72 with respect to the dimming percentage for 4 and 8 LEDs with 5 blockages. As the dimming percentage increases, the respective BER starts increasing for both cases. As the dimming percentage increases, the received power decreases, which results in an error in localization, and the effective SNR decreases. For 4 LED case, the maximum allowed dimming is 70%, while for 8 LED case, the diming is approximately 75%.

Figure 13:
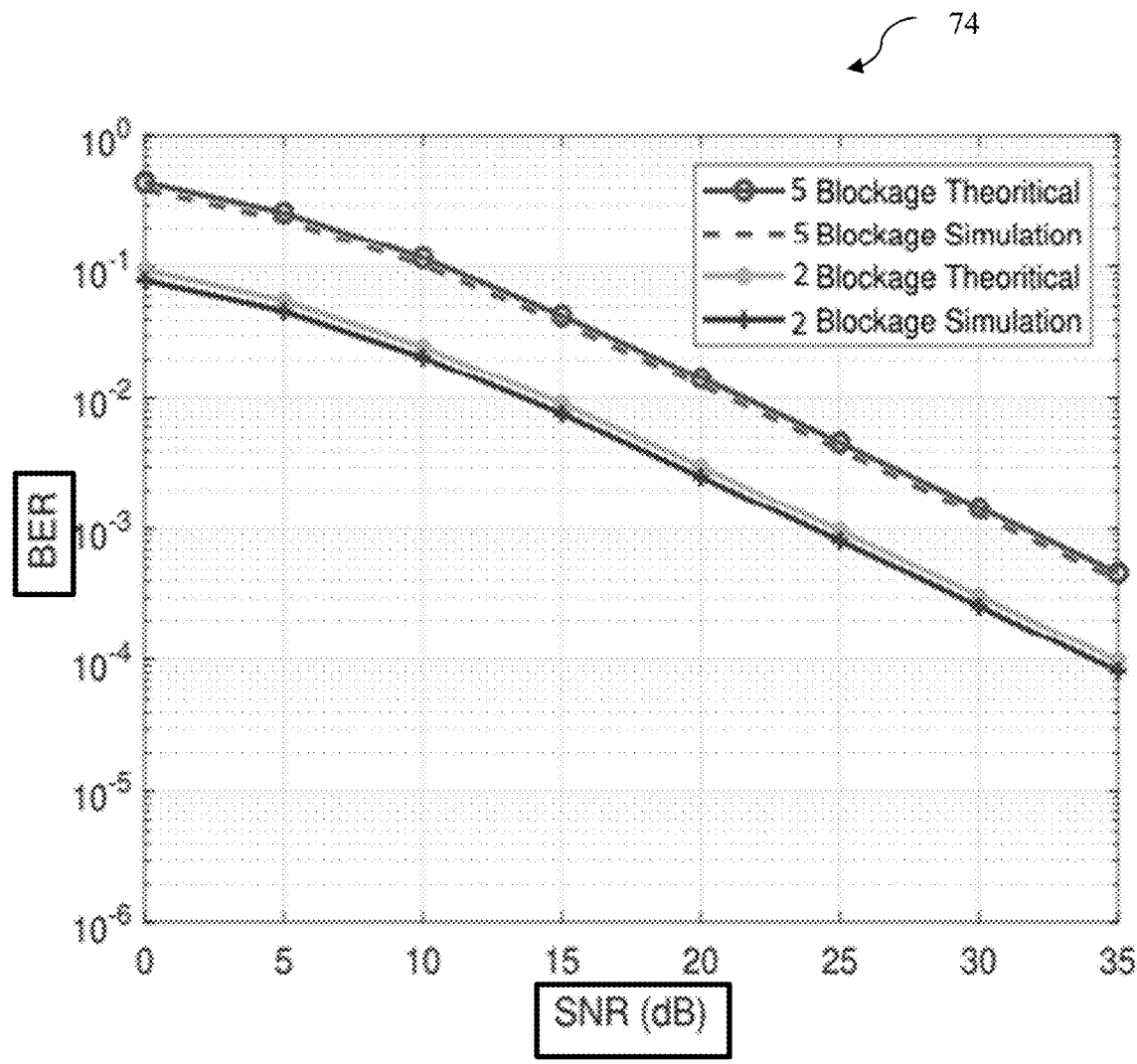
FIG. 13 B showcase the BER performance with respect to localization error in estimation with equal power allocation and proposed optimal Light Emitting Diode (LED) power allocation schemes.
Figure 13:
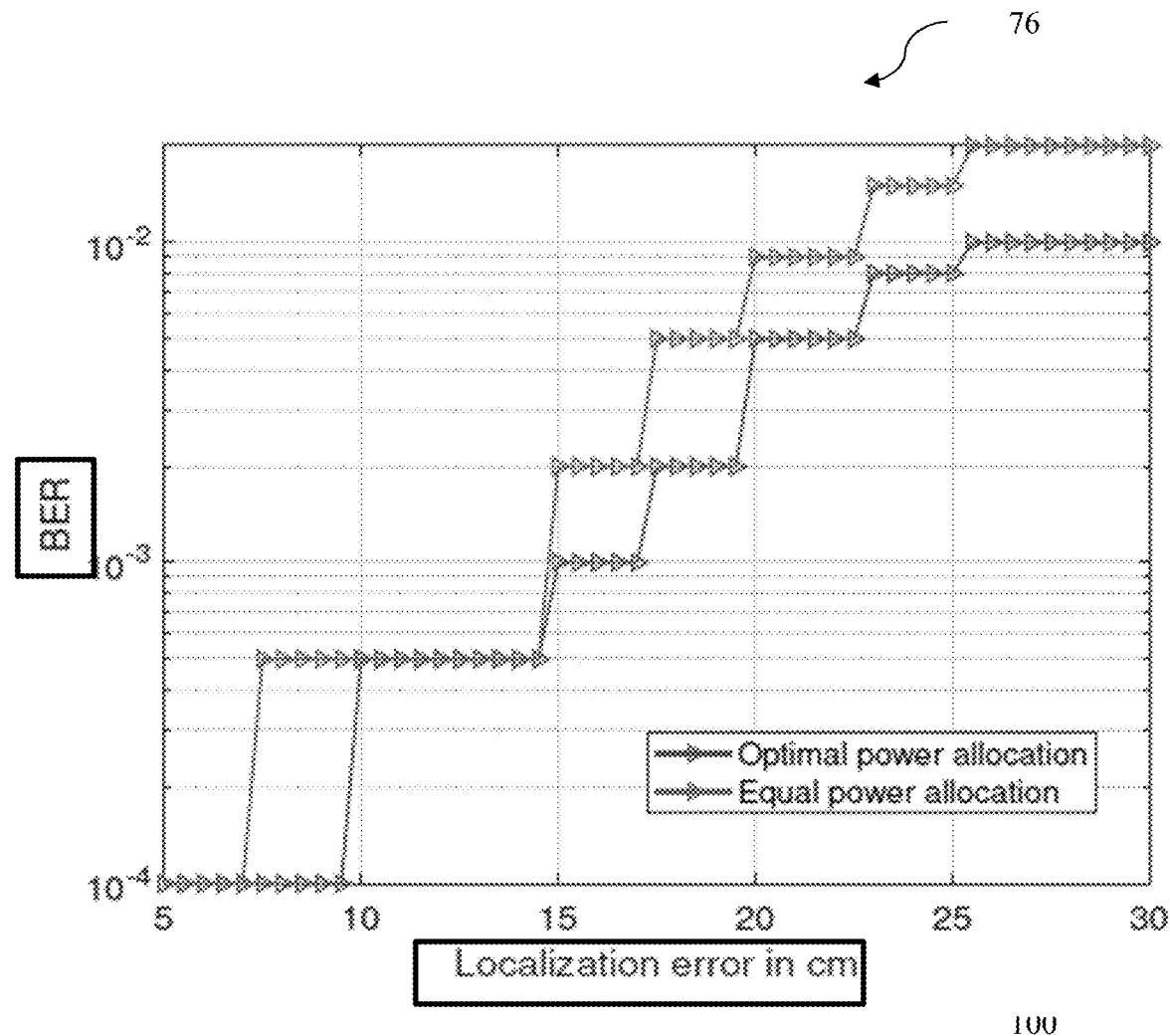

FIG. 13A shows the BER performance 74 in the presence of human blockages. The derived BER expressions and the simulation results are in close agreement. FIG. 13 B shows the BER 76 performance with respect to localization error in estimation with equal power allocation and proposed optimal Light Emitting Diode (LED) power allocation schemes. As the localization error increases, the BER decreases in both cases.

FIG. 14A showcase the BER performance 78 with blockages using OOK and DCO-OFDM, respectively using location information. To achieve the BER of 10*3 with 2 blockages, the SNR required using OOK is approximately 23 dB, whereas, in the case of DCO-OFDM is around 20 dB. Similarly, for 5 blockages, the required SNR is 30 dB, whereas, in the case of DCO-OFDM is approximately 27 dB. DCO-OFDM provides the gain of 3 dB with respect to OOK. The result is because, with DCO OFDM, the data stream is parallelized and sent through orthogonal subcarriers.

Figure 14:
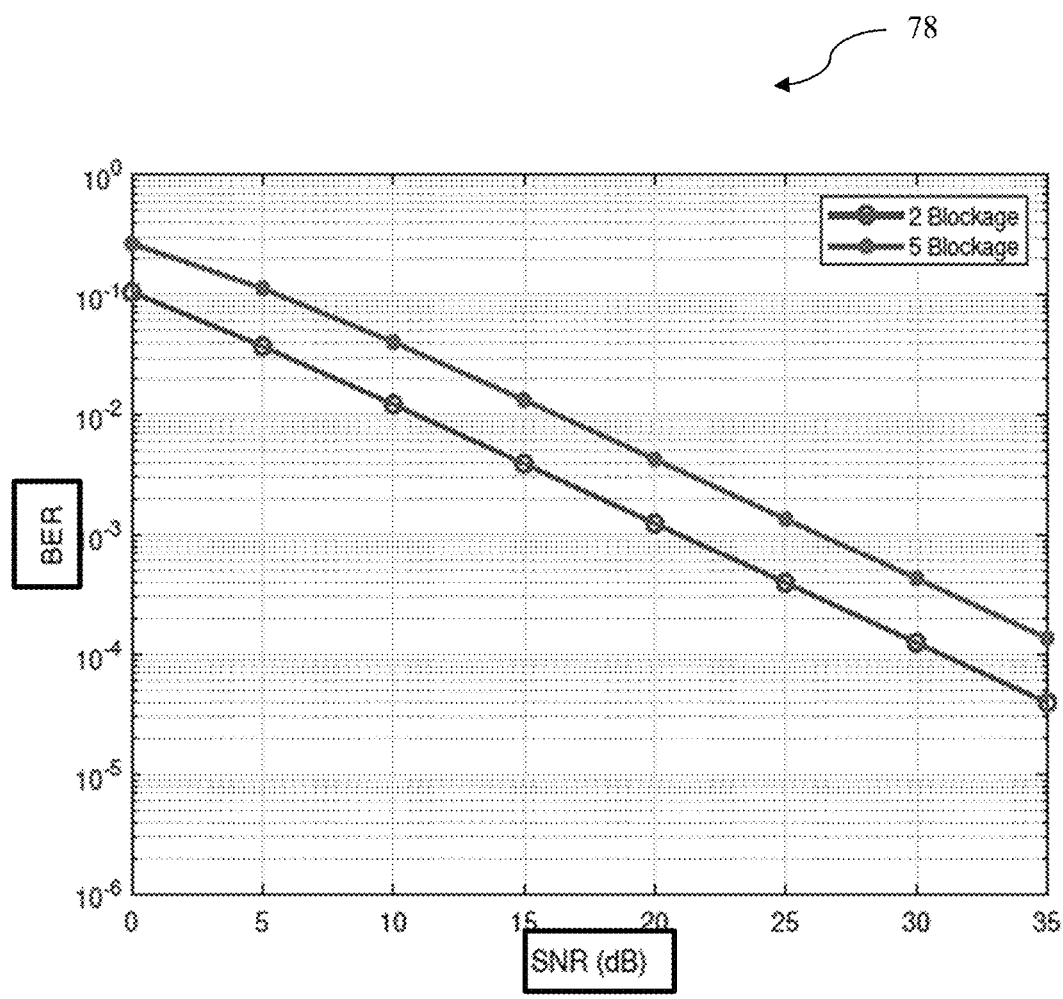
FIG. 14 B showcase the BER versus the localization error with equal and optimal power allocation scheme using OOK and DCO-OFDM, respectively.
Figure 14:
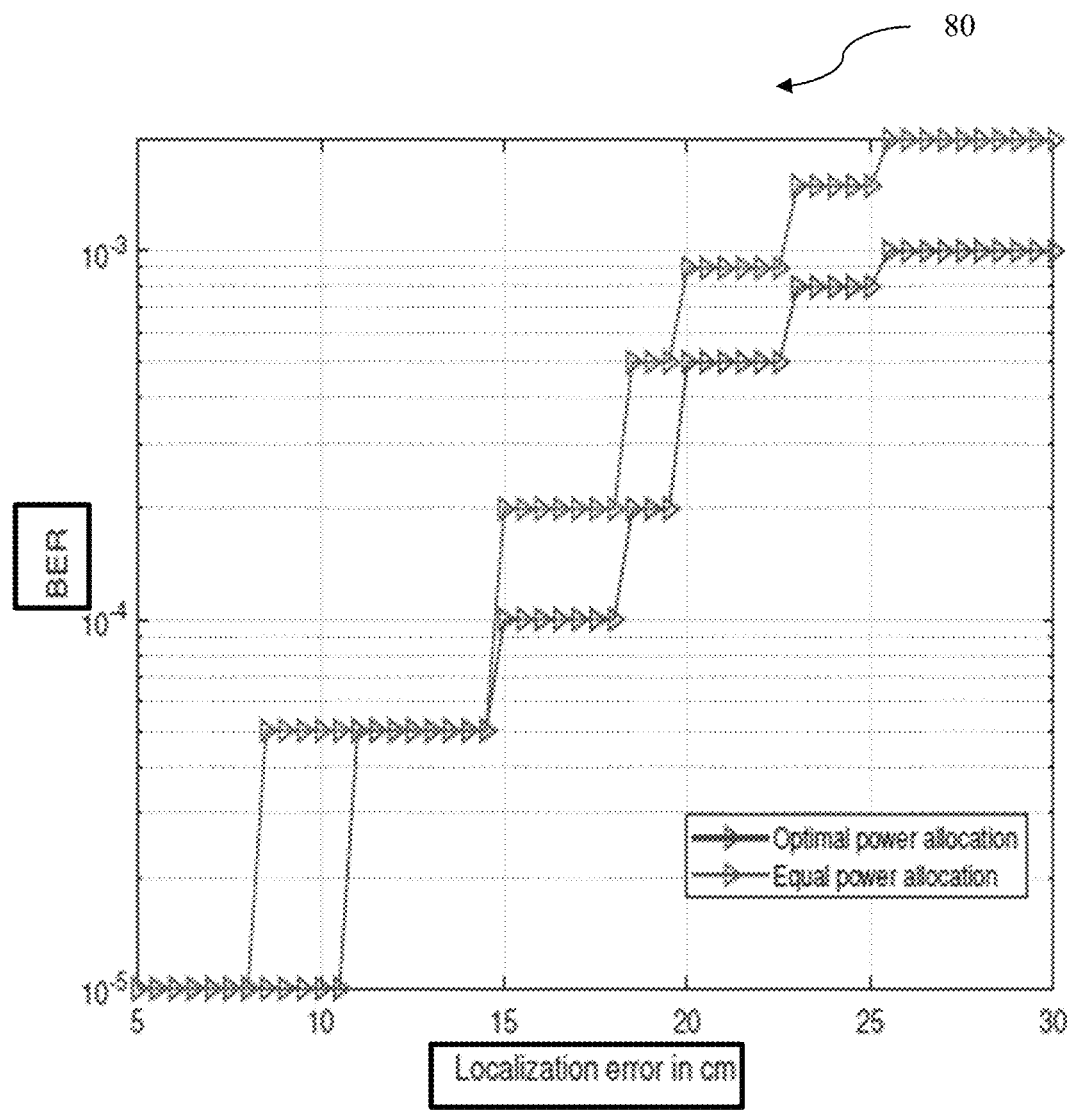

FIG. 14 B showcase the BER versus the localization error 80 with equal and optimal power allocation scheme using OOK and DCO-OFDM, respectively. As the optimum power allocation vector is calculated using received power as a reference, the Light Emitting Diode (LED) optimal power allocation vector in a change in modulation scheme remains the same. Only the BER ranges widen for DCO-OFDM in respect of the standard OOK scheme.

Figure 15:
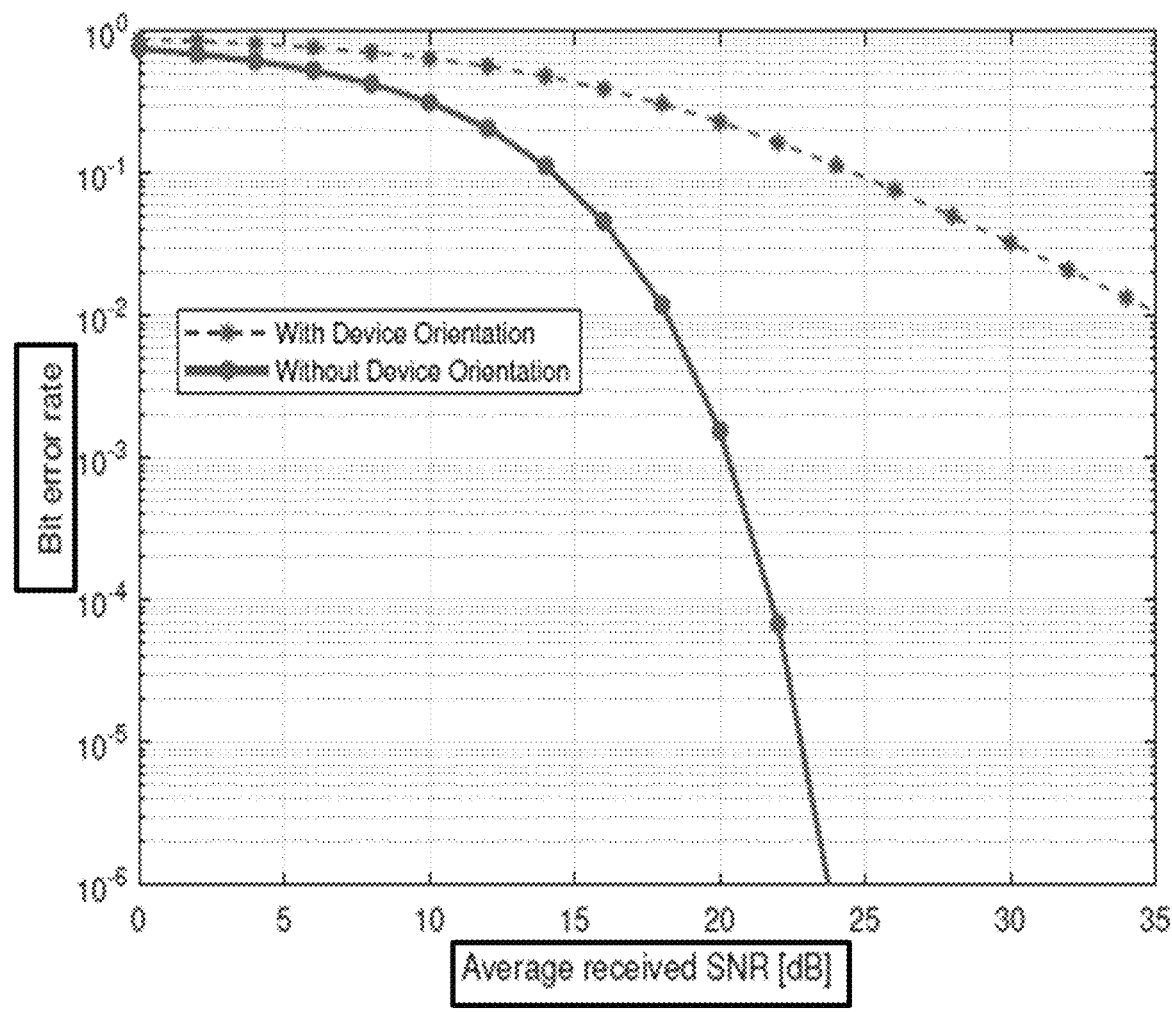
FIG. 15 showcase the impact of the effect of random device orientation on the disclosed system.

FIG. 15 showcase the impact of the effect of random device orientation 82 on the disclosed system. In such embodiment, considering random device orientation, the Bit Error Rate (BER) performance degrades even with the location information. The acquiring location information does not confirm the direction of the receiver, and the random device orientation results in self blockage, sometimes affecting the received power.

Figure 16:
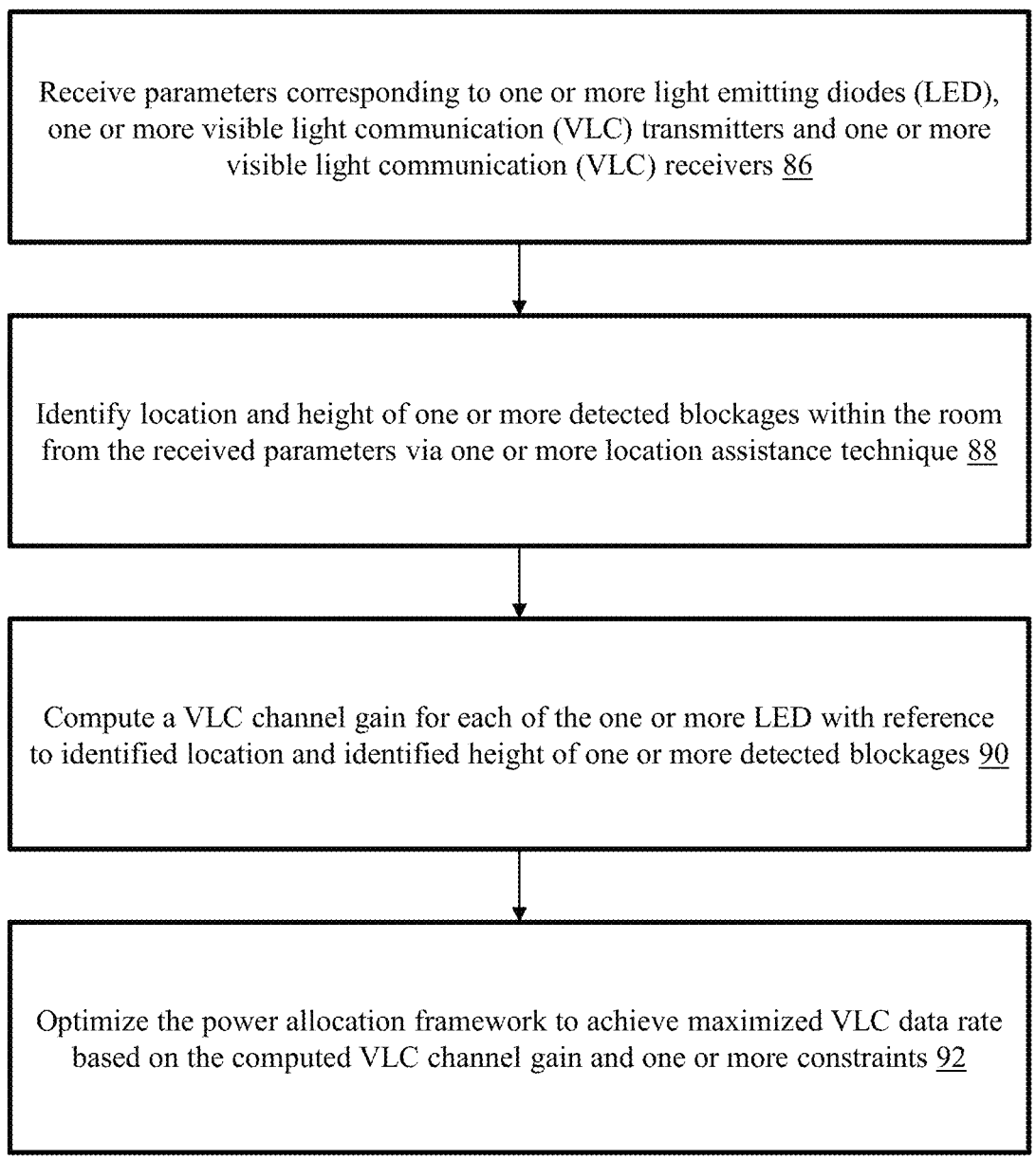
FIG. 16 is a flow chart representing the steps involved in a method (84) to optimize a light emitting diode (LED) power allocation framework within a room in accordance with an embodiment of the present disclosure.

FIG. 16 is a flow chart representing the steps involved in a method 84 to optimize a light emitting diode (LED) power allocation framework within a room in accordance with an embodiment of the present disclosure. In step 86, the method (84) includes receiving parameters corresponding to one or more light emitting diodes (LED), one or more visible light communication (VLC) transmitters and one or more visible light communication (VLC) receivers. In one specific embodiment of the present disclosure, the one or more light emitting diodes (LED), the one or more visible light communication (VLC) transmitters and the one or more visible light communication (VLC) receivers are received by a data receiving subsystem (20).

In one embodiment, receiving parameters corresponding to the one or more light emitting diodes (LED) comprises total transmitted power, refractive index, optical filter gain, wall reflection, number of users, light emitting diodes (LEDs) semi angle, number of receiver location, receiver elevation, receiver active area, receiver plane above the floor, Field of View (FOV) of the receiver, blockage radius, height of blockage, responsivity, signal bandwidth, noise bandwidth factor, and background current.

In step 88, the method 86 also includes identifying location and height of one or more detected blockages within the room from the received parameters via one or more location assistance technique. In one specific embodiment of the present disclosure, the location and height of one or more detected blockages is identified within the room from the received parameters by a blockage generalization subsystem 22.

In step 90, the method 86 also includes computing a visible light communication (VLC) channel gain for each of the one or more Light Emitting Diode (LED) with reference to identified location and identified height of one or more detected blockages. In one specific embodiment of the present disclosure, the visible light communication (VLC) channel gain for each of the one or more Light Emitting Diode (LED) is computed by the optimal power allocation subsystem 24.

In step 92, the method 86 also includes optimizing the power allocation framework to achieve maximized VLC data rate based on the computed VLC channel gain and one or more constraints. In one specific embodiment of the present disclosure, the power allocation framework is optimized to achieve maximized VLC data rate based on the computed VLC channel gain and one or more constraints by the optimal power allocation subsystem.

In one embodiment, computing of the overall Visible Light Communication (VLC) channel gain by the optimal power allocation subsystem 24 comprises summation of both the Line-of-Sight (LoS) path and the Non-Line-of-Sight (NLoS) path reflected by the walls within the room.

In another embodiment, computing the Visible Light Communication (VLC) channel gain for each of the one or more light emitting diodes (LEDs) comprises computing shadowing effect for static and dynamic blockages based on the Matern Hard Core Process (MHCP) and random waypoint (RWP) model. In yet another embodiment, the one or more constraints comprises pre-defined sum of power for each of the one or more light emitting diode (LED), pre-defined BER, a predefined range of illumination and non-negative power for each of the one or more light emitting diodes (LED).

The method 84 further includes calculation of power saved by subtracting value of equal power allocation to each of the one or more light emitting diode (LED) from the optimized allocated power to each of the one or more light emitting diode (LED). The calculation of power saved is done by optimization power saving computation subsystem.

Various embodiments of the present disclosure use the location information for exploiting and enhancing the communication performance of the user. The computing system 10 propose an optimal LED power management scheme to maximize the average data rate across the room subject based on the predefined communication constraints as well as number of blockages inside the room.

The computing system 10 also formulates a power-saving optimization framework to maximize the power savings among the LEDs with respect to the number of blockages and permissible localization error. The effect of dimming is also considered by the optimized power allocation framework. Optimal Light Emitting Diode (LED) power allocation scheme can support up to 70% and 75% dimming range of visible light with 4 and 8 Light Emitting Diode (LED) respectively.

To see the effect of a high-rate modulation scheme in the proposed system model, The computing system 10 also analyses BER performance and the localization error with DCO-OFDM and human blockage. Experimental data is provided of the proposed indoor Visible Light Communication (VLC) system inside a standard room of 5 m*5 m*3 m and 10 m*10 m*3 m.

The present invention adopts a stochastic-geometry-based approach to study the performance of an indoor Visible Light Communication (VLC) system in the presence of human blockages. In particular, the present invention considers two models of blockages: static and mobile, and further characterize the impact of the density of the blockages on the received signal strength of a receiver uniformly placed inside the room. Contrary to the existing studies on indoor Visible Light Communication (VLC) system, which typically ignore the impact of human blockages, the present invention reveals that the blockages considerably impact the propagation environment and significantly alter the system design insights.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown: nor do all of the acts need to be necessarily performed. Also, those acts that are not dependent on other acts may be performed in parallel with the other acts. The scope of embodiments is by no means limited by these specific examples.

We claim:

1. A system to optimize a light emitting diode (LED) power allocation framework within a room, the system comprising:
 a memory storing programme instructions; and
 a processor configured to execute programme instructions stored in the memory, wherein the processor comprises:
  a data receiving subsystem configured to receive parameters corresponding to one or more light emitting diodes (LED), one or more visible light communication (VLC) transmitters and one or more visible light communication (VLC) receivers;
  a blockage generalization subsystem configured to identify location and height of one or more detected blockages within the room from the received parameters via one or more location assistance technique, wherein the one or more detected blockages comprises human blockage and objects,
   wherein the one or more location assistance technique comprises a linear regression technique; and
  an optimal power allocation subsystem configured to compute a visible light communication (VLC) channel gain for each of the one or more light emitting diodes (LED) with reference to identified location and identified height of one or more detected blockages from the blockage generalization subsystem; and
  optimize the power allocation framework to achieve maximized visible light communication (VLC) data rate based on the computed visible light communication (VLC) channel gain and one or more constraints.

2. The system of claim 1, wherein the received parameters comprise parameters related to total transmitted power, refractive index, optical filter gain, wall reflection, number of users, Light Emitting Diode (LED) semi angle, number of receiver location, receiver elevation, receiver active area, receiver plane above the floor, Field of View (FOV) of the receiver, blockage radius, height of blockage, responsivity, signal bandwidth, noise bandwidth factor, and background current.

3. The system of claim 1, wherein to compute the visible light communication (VLC) channel gain for each of the one or more light emitting diodes (LED), the optimal power allocation subsystem computes the overall visible light communication (VLC) channel gain, whereby the overall visible light communication (VLC) channel gain refers to sum of both the Line-of-Sight (LoS) path and the Non-Line-of-Sight (NLoS) path reflected by the walls within the room.

4. The system of claim 1, wherein to compute the visible light communication (VLC) channel gain for each of the one or more light emitting diodes (LED), the optimal power allocation subsystem computes the shadowing effect for static and dynamic blockages based on Matern Hard Core Process (MHCP) and random waypoint (RWP) model.

5. The system of claim 1, wherein the one or more constraints comprises pre-defined sum of power for each of the one or more light emitting diodes (LED), pre-defined BER, a predefined range of illumination and non-negative power for each of the one or more light emitting diodes (LED).

6. The system of claim 1, further comprising optimization power saving computation subsystem configured to compute the power saved by subtracting the value of equal power allocation to each of the one or more light emitting diodes (LED) from the optimized allocated power to each of the one or more light emitting diodes (LED).

7. A method to optimize a light emitting diode (LED) power allocation framework within a room, the method comprising:
 receiving, by a processor, parameters corresponding to one or more light emitting diodes (LED), one or more visible light communication (VLC) transmitters and one or more visible light communication (VLC) receivers;
 identifying, by the processor, location and height of one or more detected blockages within the room from the received parameters via one or more location assistance technique;
 computing, by the processor, a visible light communication (VLC) channel gain for each of the one or more Light Emitting Diode (LED) with reference to identified location and identified height of one or more detected blockages; and
 optimizing, by the processor, the power allocation framework to achieve maximized visible light communication (VLC) data rate based on the computed visible light communication (VLC) channel gain and one or more constraints.

8. The method of claim 7, wherein receiving parameters, by the data receiving subsystem, corresponding to the one or more light emitting diodes (LED) comprises total transmitted power, refractive index, optical filter gain, wall reflection, number of user, light emitting diodes (LEDs) semi angle, number of receiver location, receiver elevation, receiver active area, receiver plane above the floor, Field of View (FOV) of the receiver, blockage radius, height of blockage, responsivity, signal bandwidth, noise bandwidth factor, and background current.

9. The method of claim 7, wherein computing the overall Visible Light Communication (VLC) channel gain by the optimal power allocation subsystem comprises summation of both the Line-of-Sight (LoS) path and the Non-Line-of-Sight (NLoS) path reflected by the walls within the room.

10. The method of claim 7, wherein computing the Visible Light Communication (VLC) channel gain for each of the one or more light emitting diodes (LEDs) comprises computing shadowing effect for static and dynamic blockages based on the Matern Hard Core Process (MHCP) and random waypoint (RWP) model.

11. The method of claim 7, wherein the one or more constraints comprises pre-defined sum of power for each of the one or more light emitting diode (LED), pre-defined BER, a predefined range of illumination and non-negative power for each of the one or more light emitting diodes (LED).

12. The method of claim 7, wherein power saved is calculated by subtracting value of equal power allocation to each of the one or more light emitting diode (LED) from the optimized allocated power to each of the one or more light emitting diode (LED).

13. A non-transitory computer readable-medium having program code stored thereon, the computer readable program code having instructions that, when executed by the processor, causes the processor to:
 receive parameters corresponding to one or more light emitting diode (LED), one or more visible light communication (VLC) transmitters and one or more visible light communication (VLC) receivers;
 identify location and height of one or more detected blockages within the room from the received parameters via one or more location assistance technique;
 compute a visible light communication (VLC) channel gain for each of the one or more light emitting diode (LED) with reference to identified location and identified height of one or more detected blockages; and optimize the power allocation framework to achieve maximized visible light communication (VLC) data rate based on the computed visible light communication (VLC) channel gain and one or more constraints.

\* \* \* \* \*